United States Patent
Fulford

(10) Patent No.: US 9,850,149 B2
(45) Date of Patent: Dec. 26, 2017

(54) INTEGRATED WATER TREATMENT SYSTEM

(75) Inventor: Galen Yarrow Fulford, Forres (GB)

(73) Assignee: Biomatrix Water Solutions Limited (GB)

( * ) Notice: Subject to any disclaimer, the term of this patent is extended or adjusted under 35 U.S.C. 154(b) by 705 days.

(21) Appl. No.: 14/005,427

(22) PCT Filed: Mar. 19, 2012

(86) PCT No.: PCT/GB2012/050599
§ 371 (c)(1),
(2), (4) Date: Feb. 5, 2014

(87) PCT Pub. No.: WO2012/123767
PCT Pub. Date: Sep. 20, 2012

(65) Prior Publication Data
US 2015/0041376 A1    Feb. 12, 2015

(30) Foreign Application Priority Data

Mar. 17, 2011 (GB) .................................... 1104538.2
Mar. 17, 2011 (GB) .................................... 1104540.8

(51) Int. Cl.
*C02F 3/00* (2006.01)
*C02F 3/10* (2006.01)
(Continued)

(52) U.S. Cl.
CPC ................ *C02F 3/10* (2013.01); *C02F 3/103* (2013.01); *C02F 3/20* (2013.01); *C02F 3/206* (2013.01);
(Continued)

(58) Field of Classification Search
CPC ...... C02F 3/327; C02F 2103/007; C02F 7/00; C02F 3/103; Y02W 10/18; Y02W 10/15; Y02P 60/642; A01K 61/006; A01K 63/04
(Continued)

(56) References Cited

U.S. PATENT DOCUMENTS 3,951,085 A * 4/1976 Johnson .................... B63B 5/18
114/266
5,106,504 A * 4/1992 Murray ................. C02F 3/1215
210/170.03
(Continued)

FOREIGN PATENT DOCUMENTS

EP    2295382    3/2011
JP    9206788    8/1997
(Continued)

OTHER PUBLICATIONS

Lim, English Machine translation KR 100423364, Mar. 10, 2004, pp. 1-6.*
(Continued)

*Primary Examiner* — Claire Norris
(74) *Attorney, Agent, or Firm* — Workman Nydegger

(57) ABSTRACT

The invention provides an integrated water treatment system suitable for use in the treatment of contaminated water, wastewater, potable water, aquaculture, industrial water and polluted water bodies. An integrated water treatment system according to at least one embodiment of the invention comprises a plurality of modules adapted to float in a body of water integrating a plurality of different attached growth biofilm media types positioned within a plurality of water flow paths and circulations. The conditions provided by a multiple of media types and plurality of flow paths creates a multiplier effect increasing the number of treatment zones and an increased diversity of interconnected treatment process zone types. Embodiments of the invention provide a diversity of conditions and biological habitats establishing a poly-culture of producers, consumers and higher organisms in an ecosystem of biological treatment processes, with complex metabolic pathways and food chains increasing treatment efficiency and the range of pollutants which may be effectively treated. Modules comprised in the system are
(Continued)

adjustable in operational rate, series, and timing, and are movable in configuration and/or proximity providing a new type of adaptable, re-configurable and adjustable multi-zone, integrated ecological biofilm water treatment system.

16 Claims, 30 Drawing Sheets

(51) Int. Cl.
    *C02F 3/20*     (2006.01)
    *C02F 3/32*     (2006.01)
    *C02F 7/00*     (2006.01)
    *C02F 103/00*     (2006.01)

(52) U.S. Cl.
    CPC ................ *C02F 3/327* (2013.01); *C02F 7/00* (2013.01); *C02F 2103/007* (2013.01); *C02F 2203/00* (2013.01); *Y02W 10/15* (2015.05); *Y02W 10/18* (2015.05)

(58) Field of Classification Search
    USPC ........ 210/602, 170.05, 242.1, 170.09, 242.2, 210/615, 620, 747.5, 747.6
    See application file for complete search history.

(56) References Cited

U.S. PATENT DOCUMENTS

| | | | |
|---|---|---|---|
| 6,190,555 B1 * | 2/2001 | Kondo | C02F 3/103 210/150 |
| 2005/0269262 A1 | 12/2005 | Mcbride | |
| 2010/0018470 A1 * | 1/2010 | Kim | A01K 61/007 119/223 |
| 2011/0108472 A1 * | 5/2011 | Kania | A01G 31/02 210/151 |
| 2012/0012516 A1 * | 1/2012 | Torres Junco | C02F 3/327 210/242.1 |

FOREIGN PATENT DOCUMENTS

| | | | | |
|---|---|---|---|---|
| JP | 2001293493 | | 10/2001 | |
| JP | 2002066590 | | 3/2002 | |
| KR | 100423364 B1 | * | 3/2004 | |
| KR | 101014825 | | 2/2011 | |
| WO | WO2009141463 | * | 11/2009 | ................ C02F 3/32 |

OTHER PUBLICATIONS

International Search Report and Written Opinion for PCT/GB2012/050599.

* cited by examiner

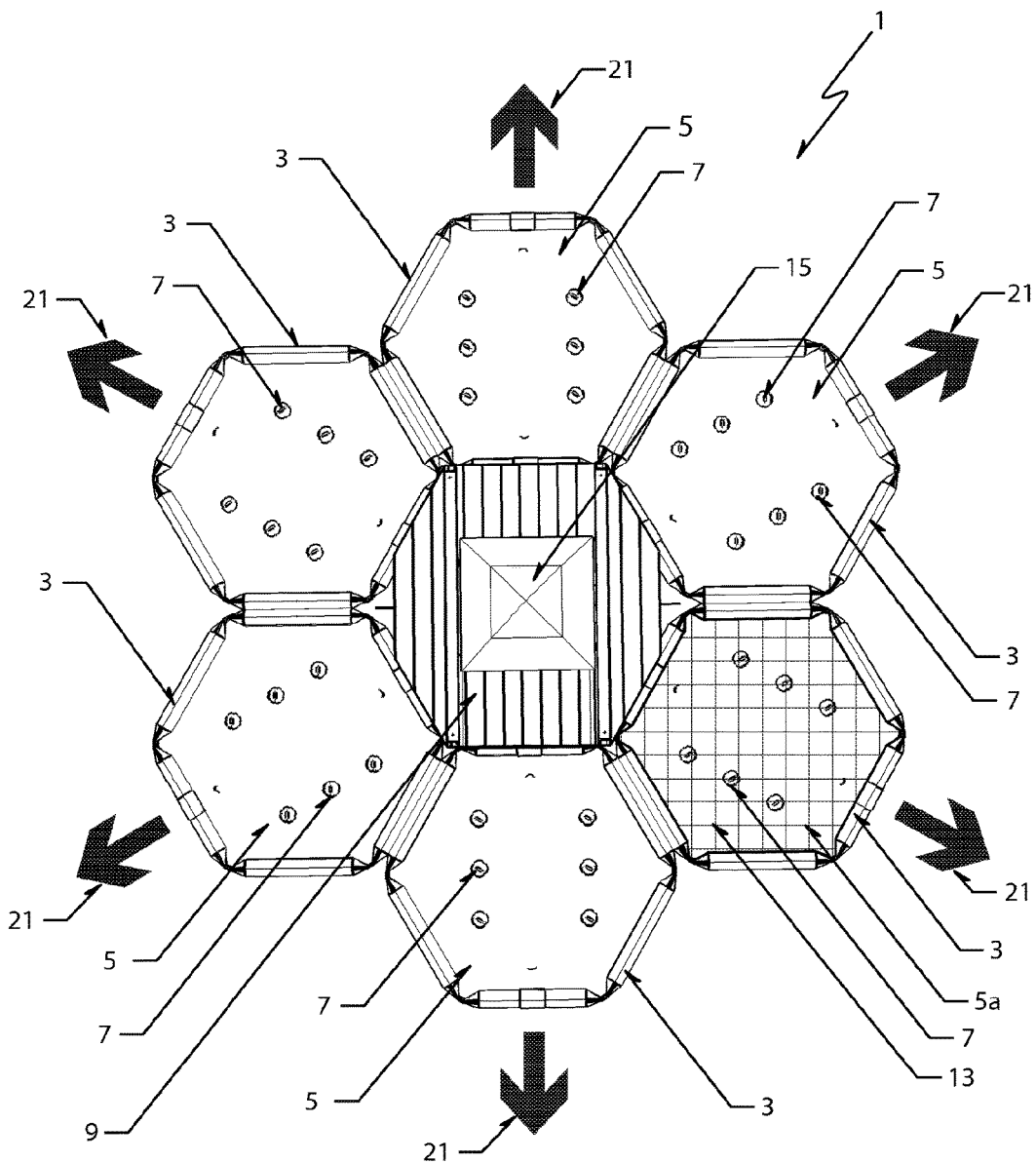
Figure #1

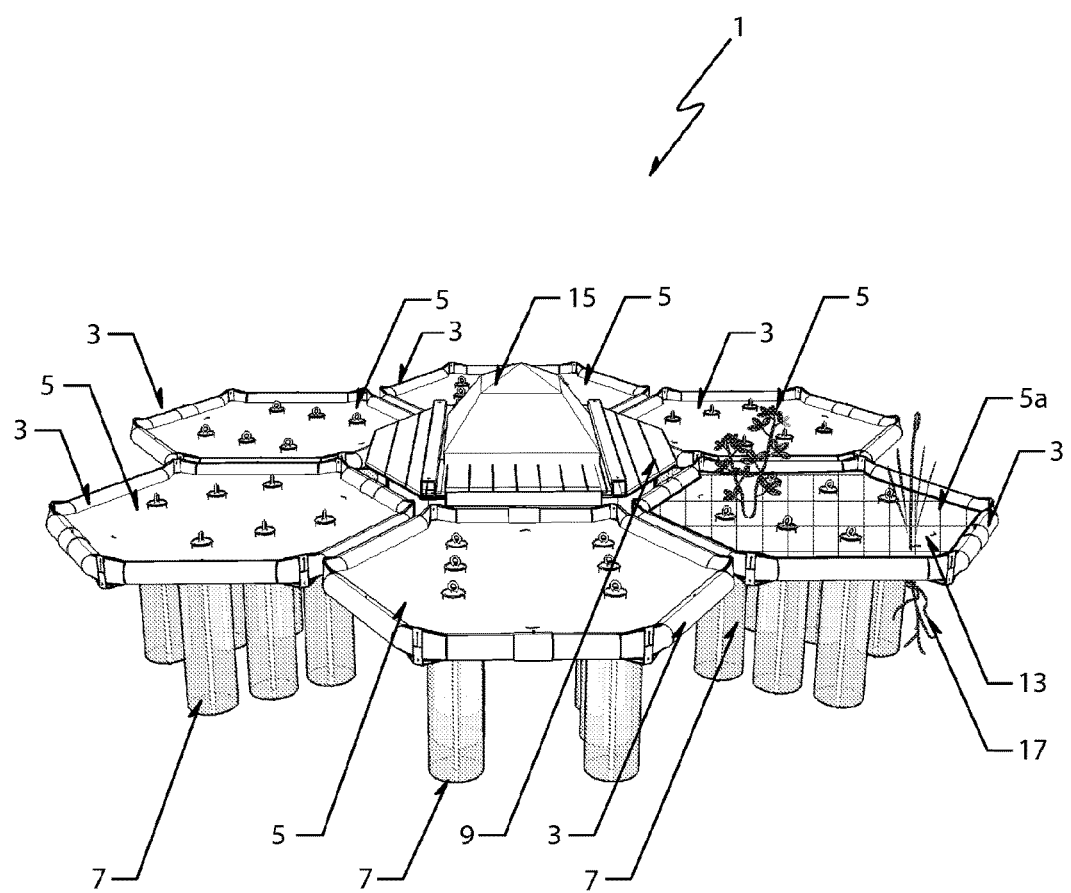
Figure #2

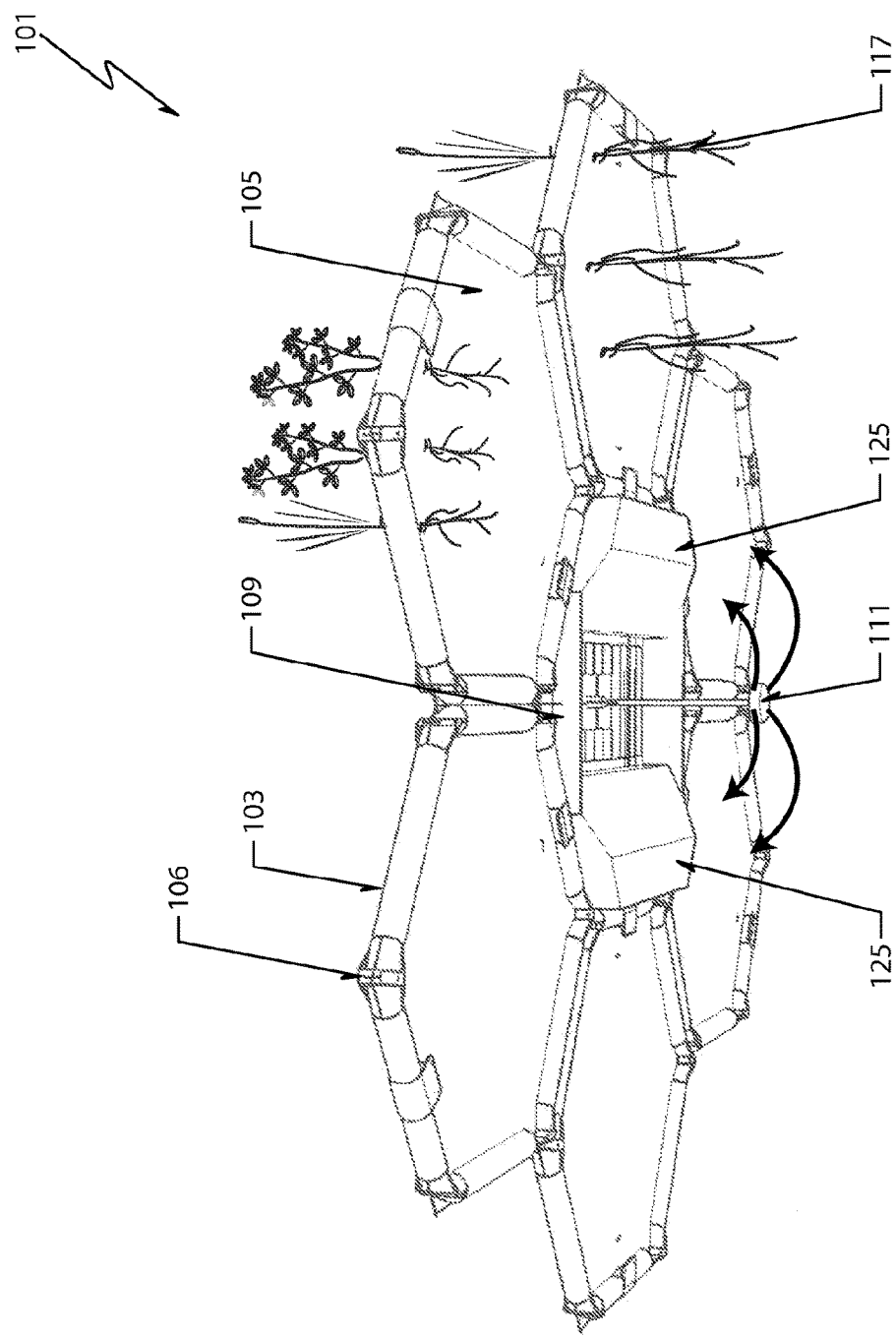
Figure #3

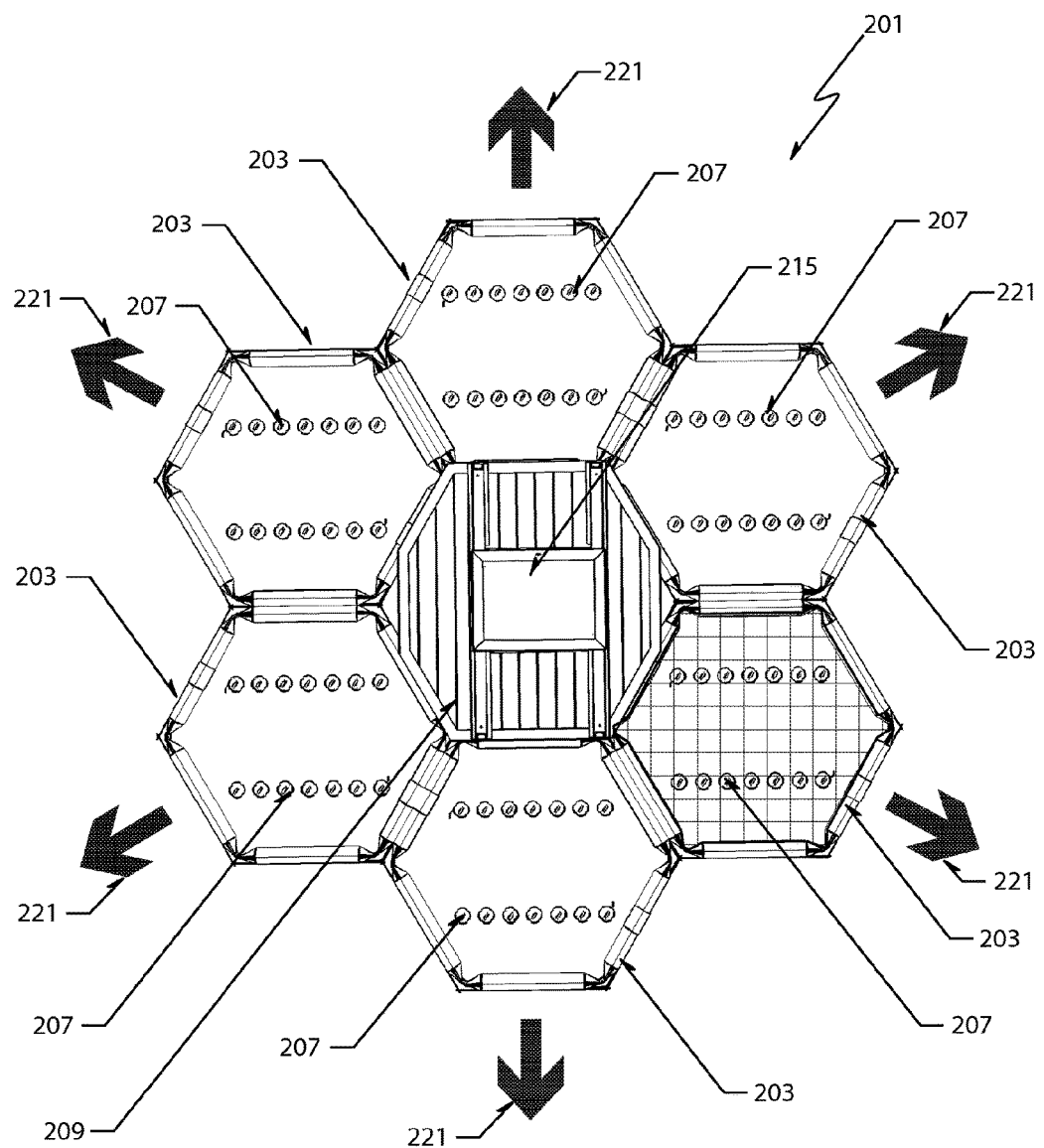
Figure #4

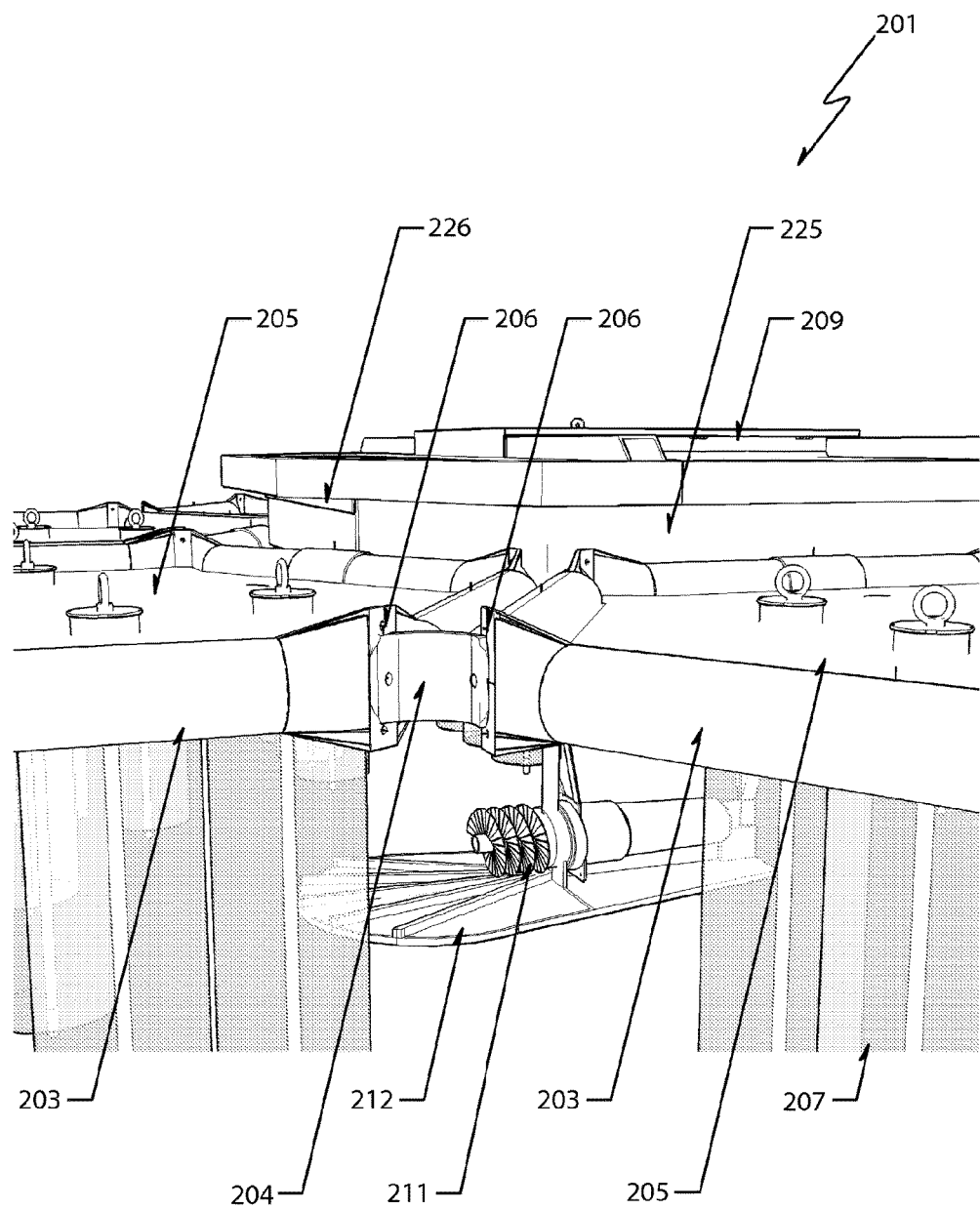
Figure #5

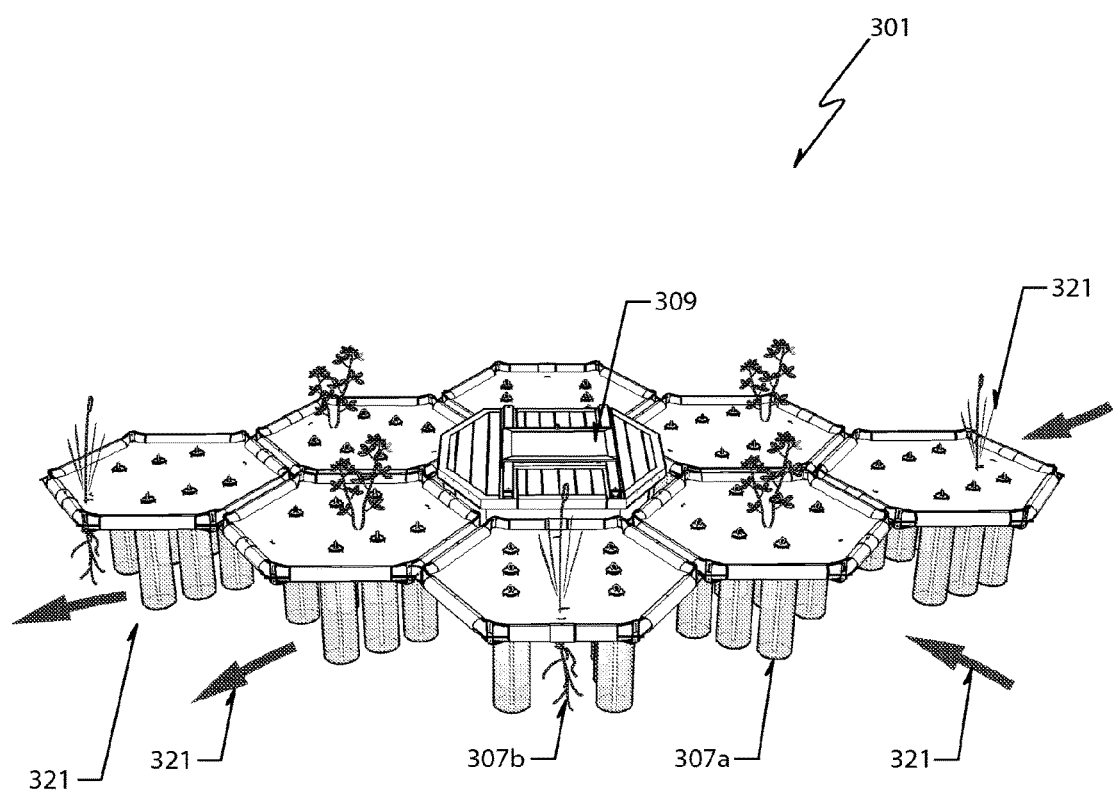
Figure #6

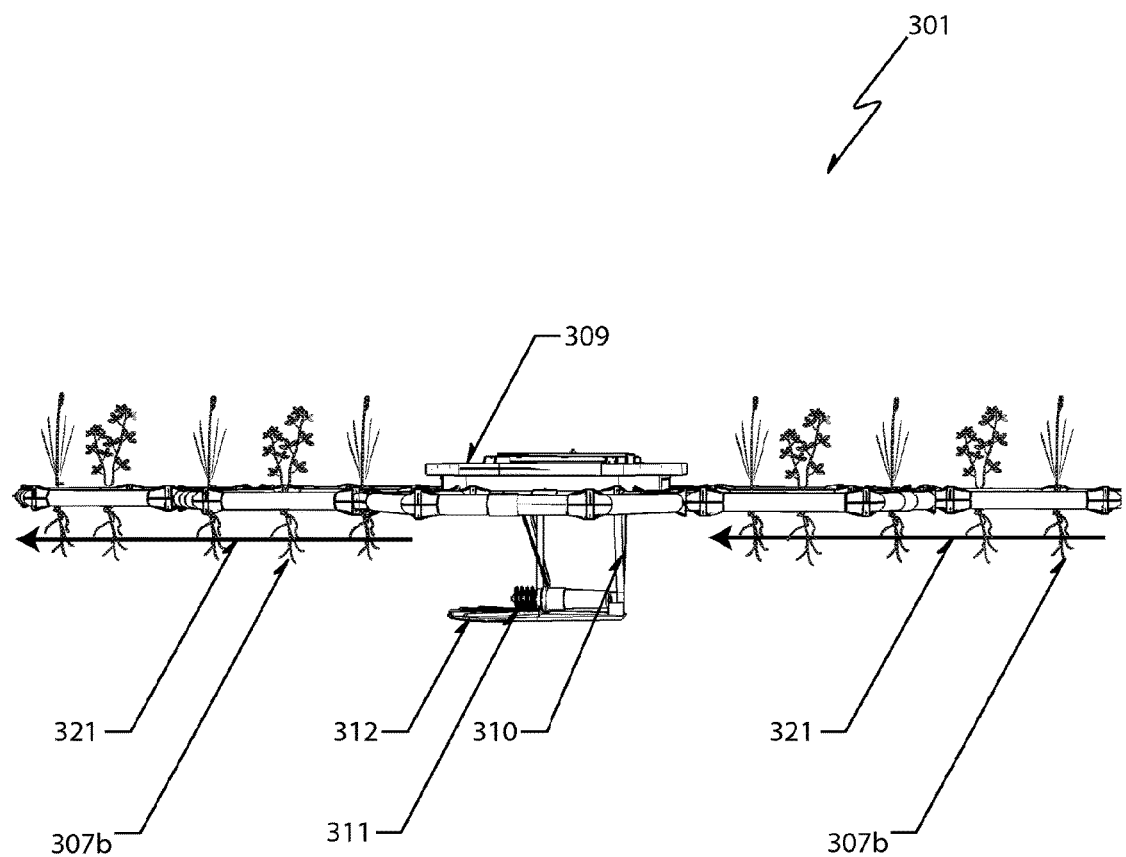
Figure #7

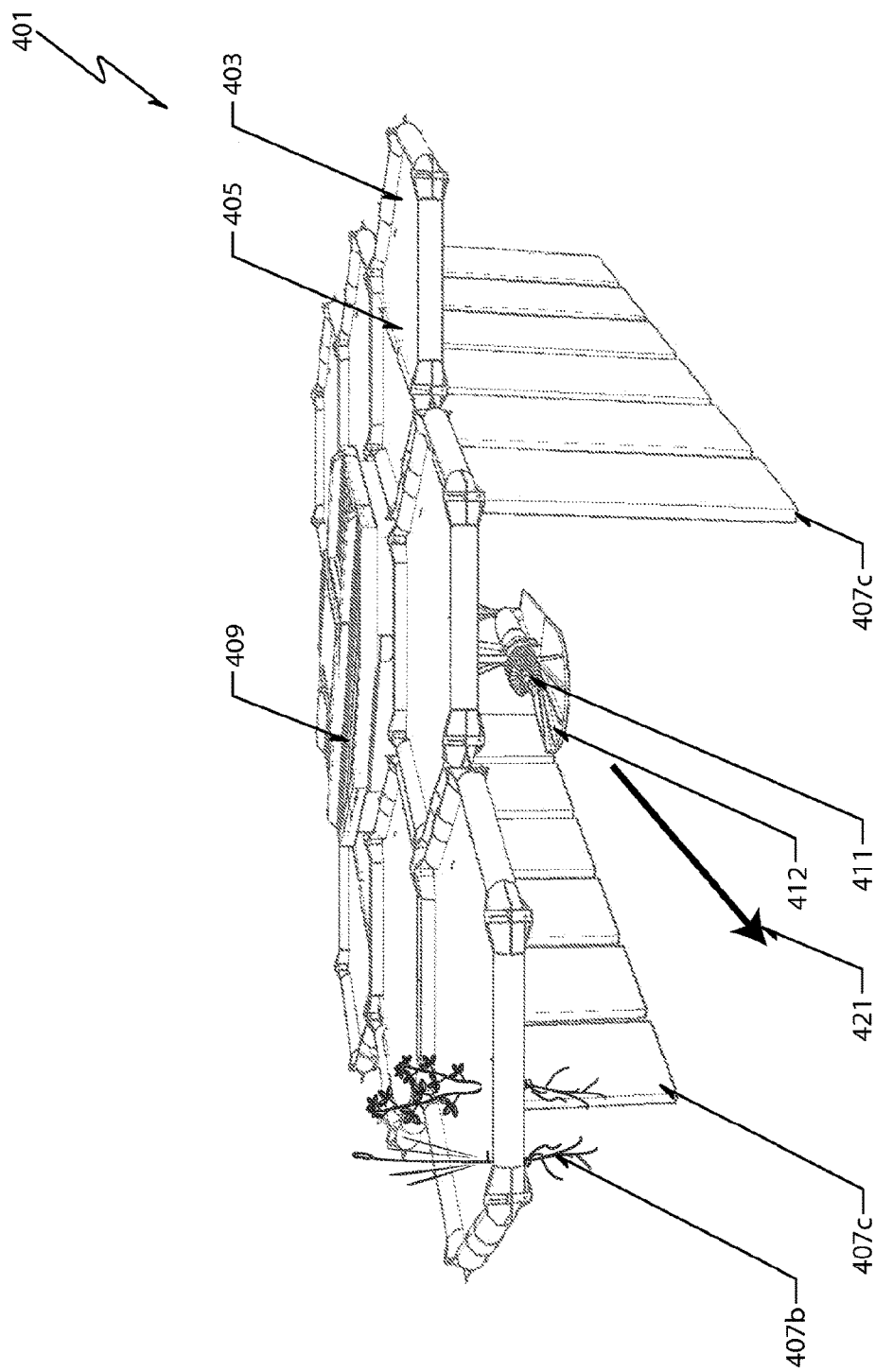
Figure #8

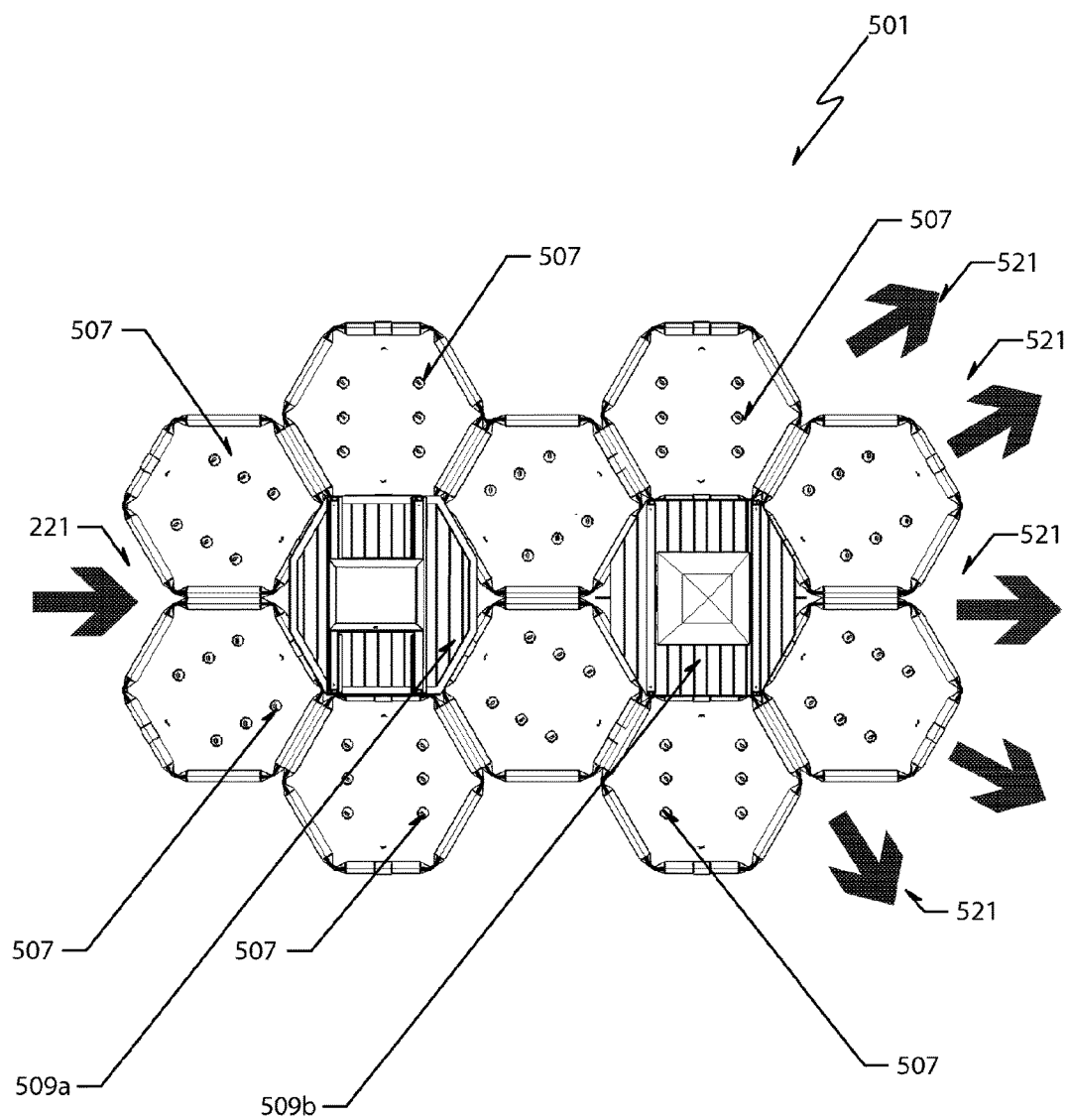
Figure #9

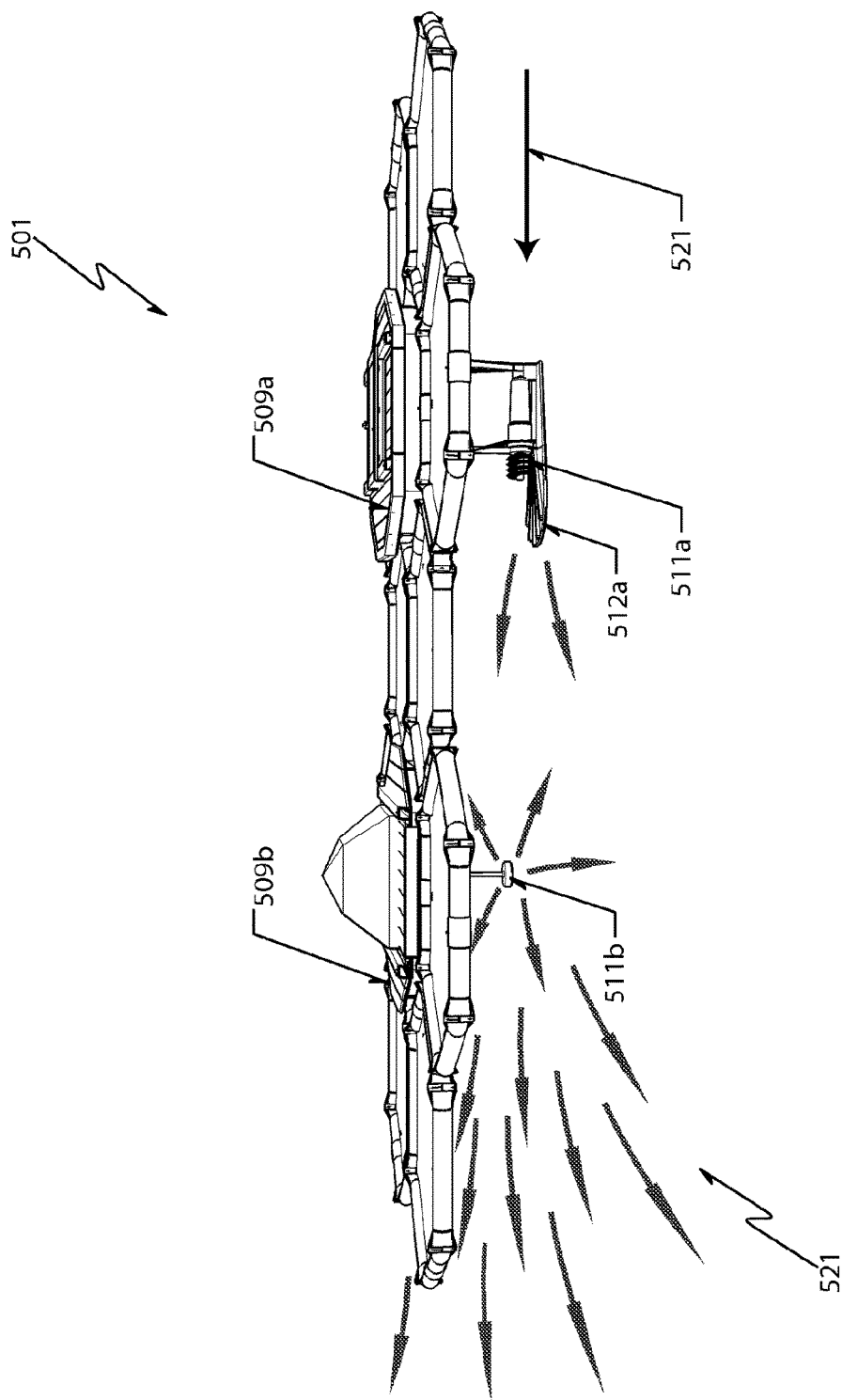
Figure #10

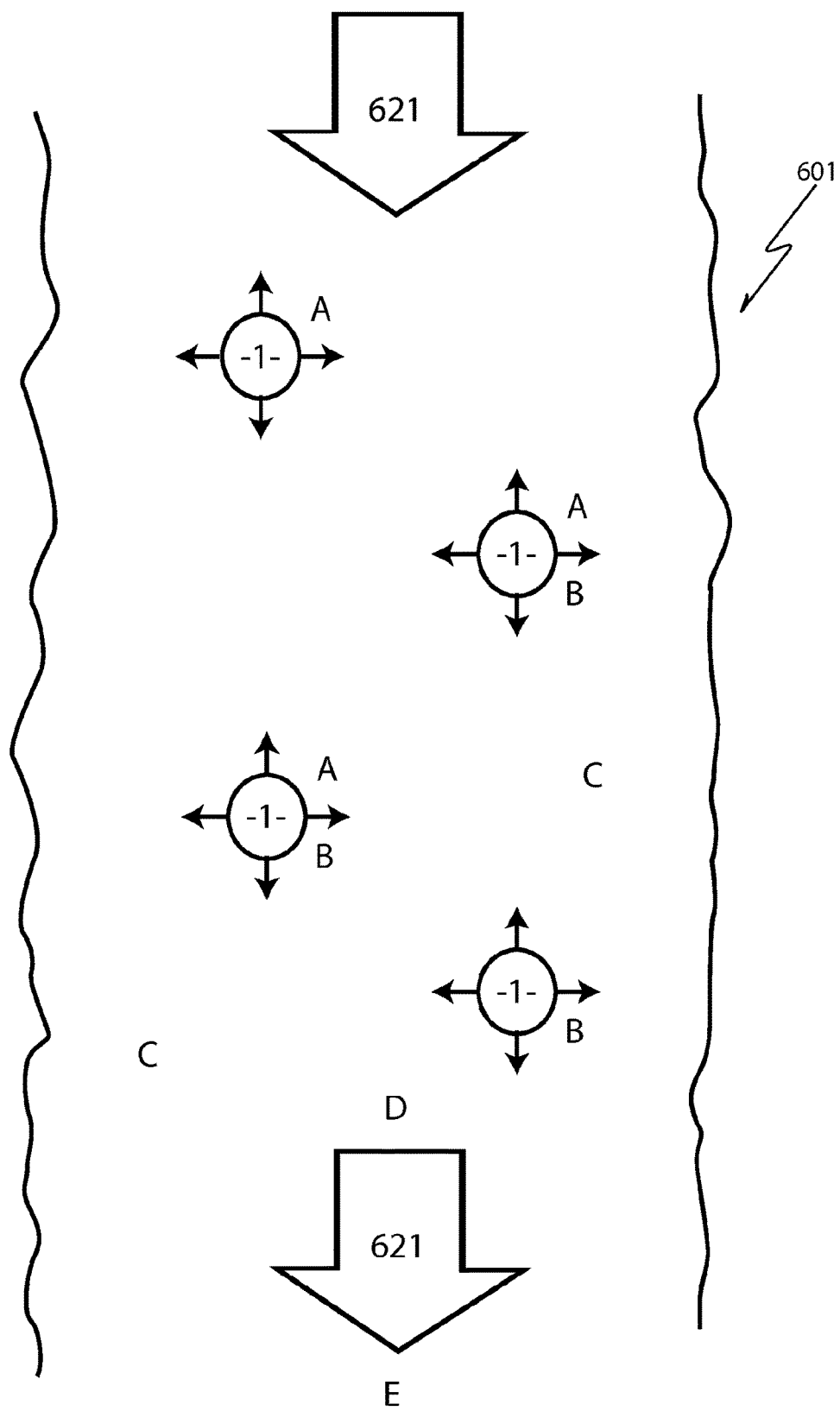
Figure #11

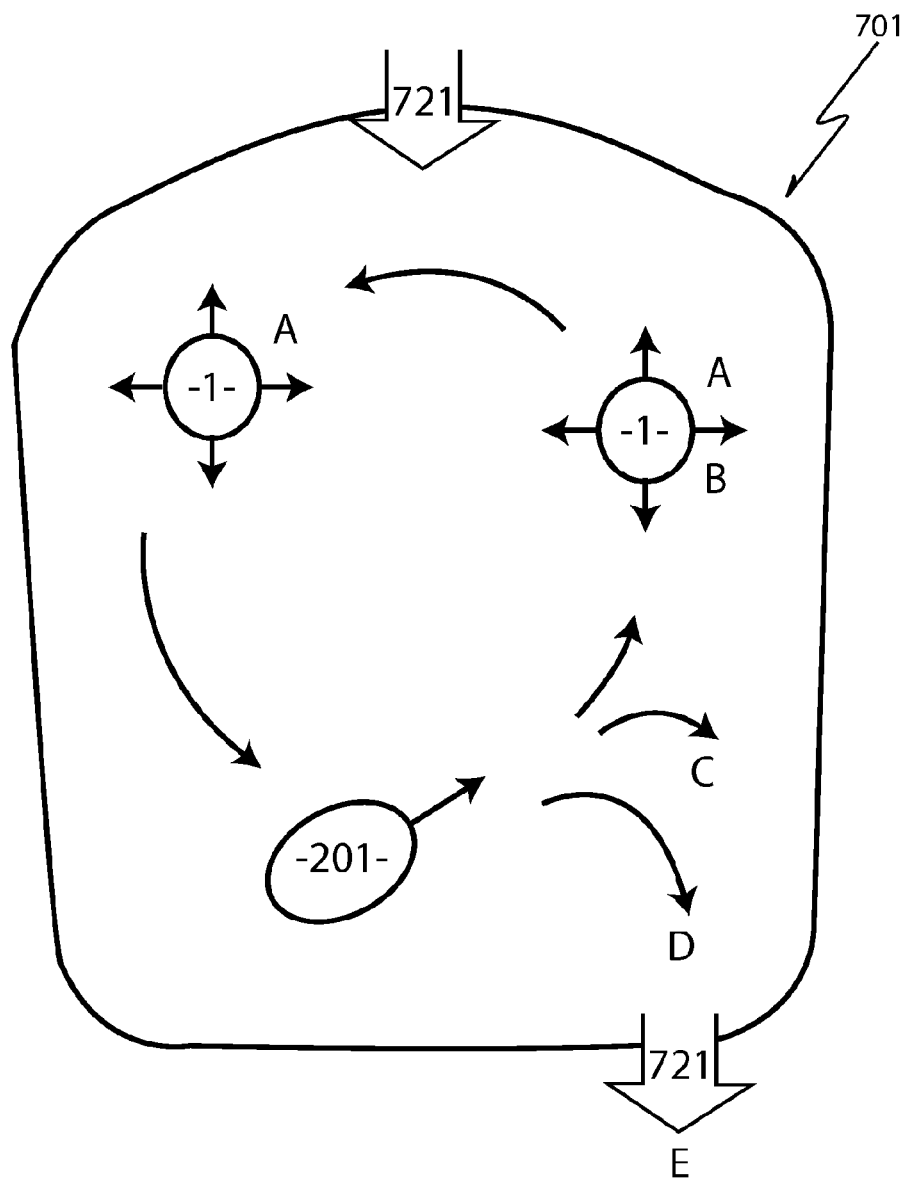
Figure #12

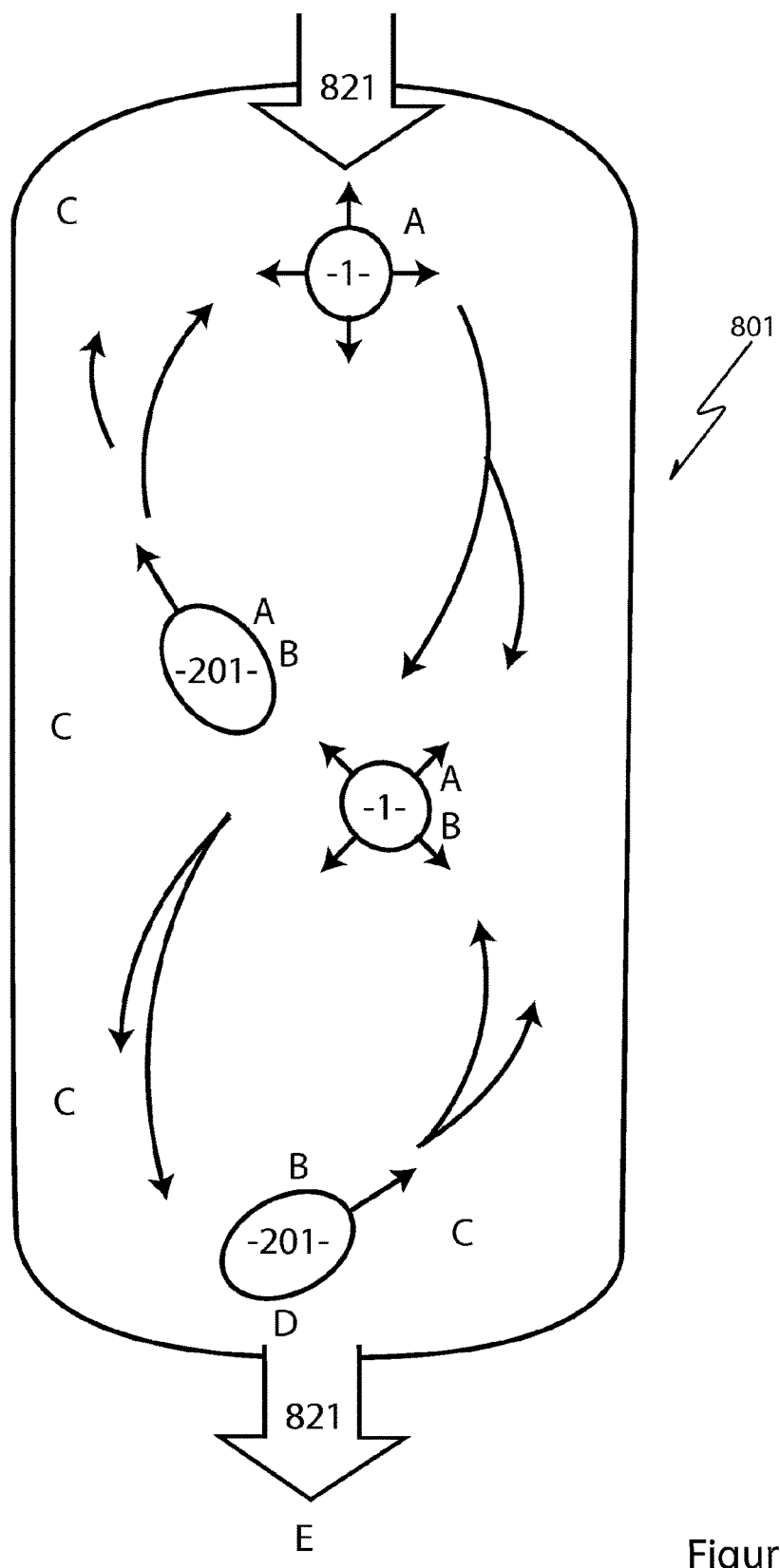
Figure #13

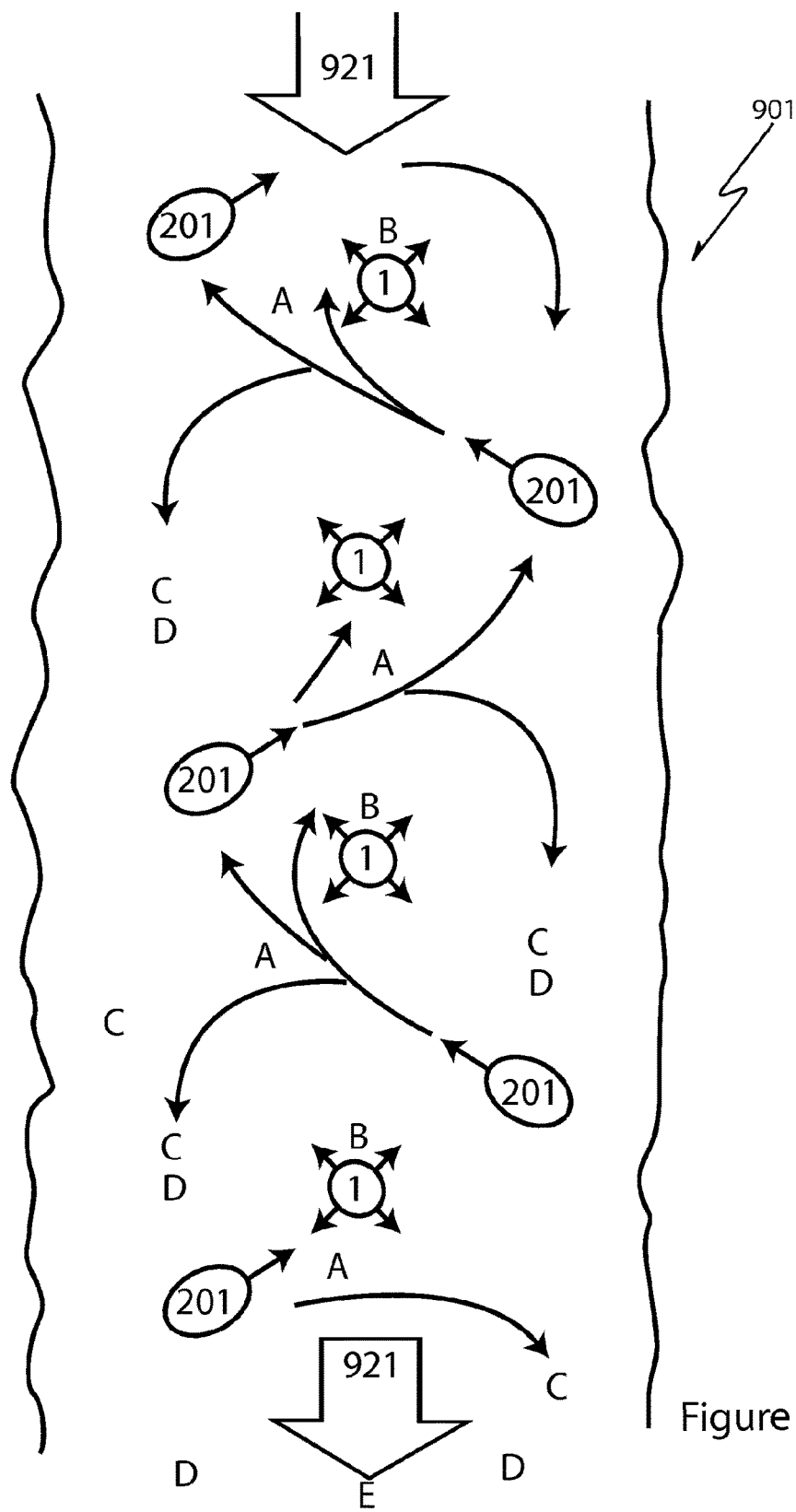
Figure #14

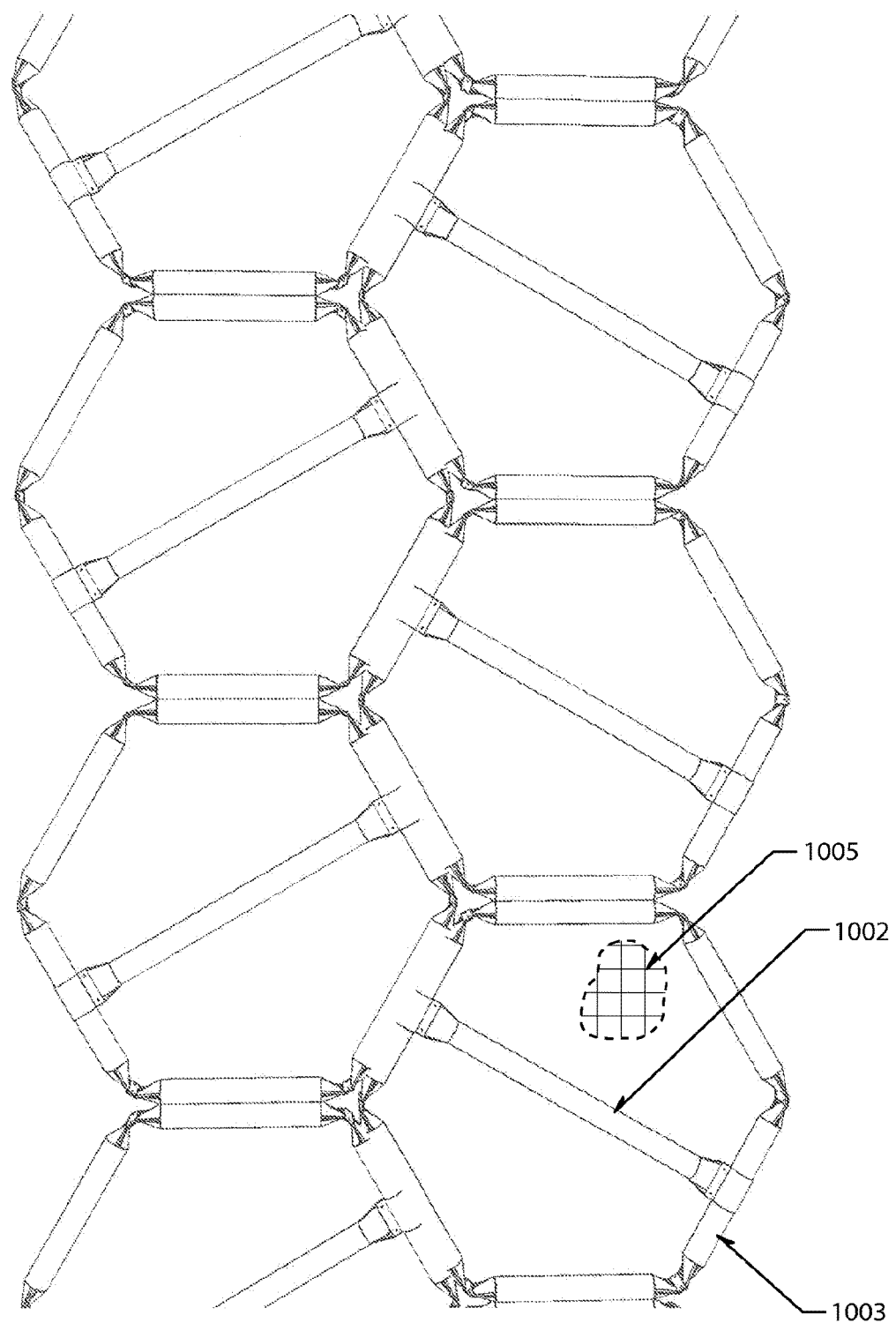
Figure #15

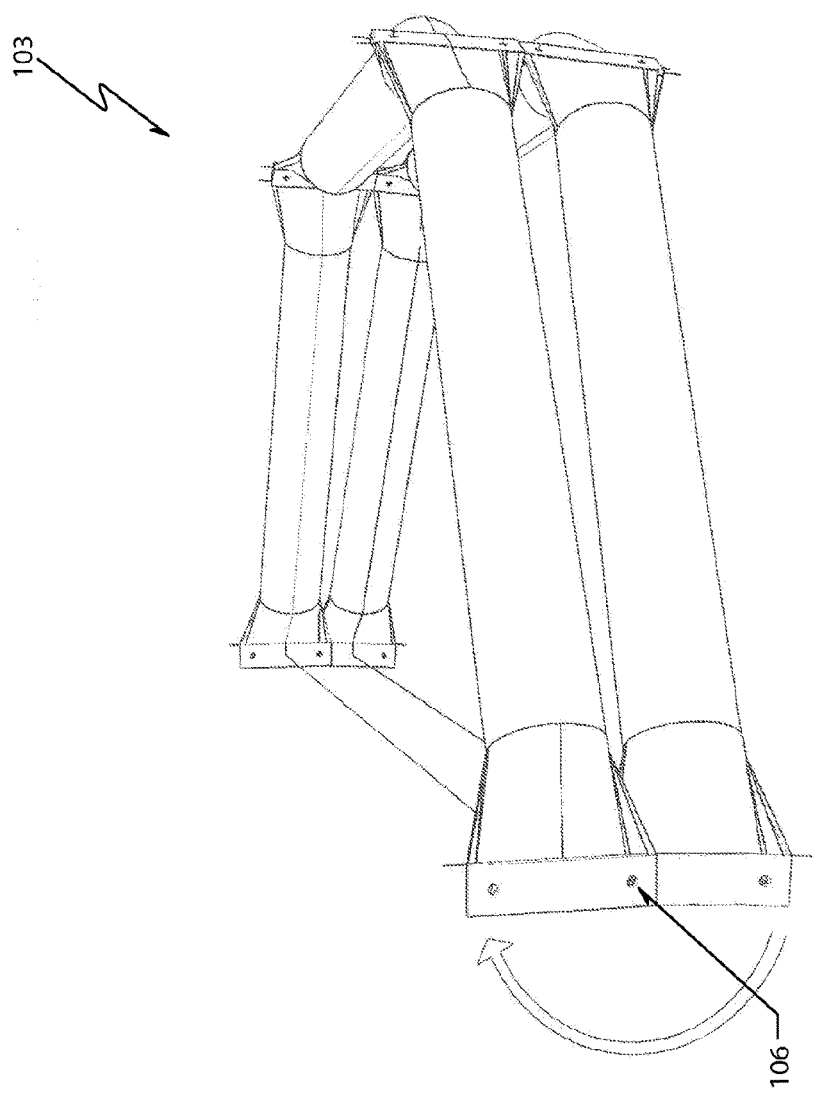
Figure #16

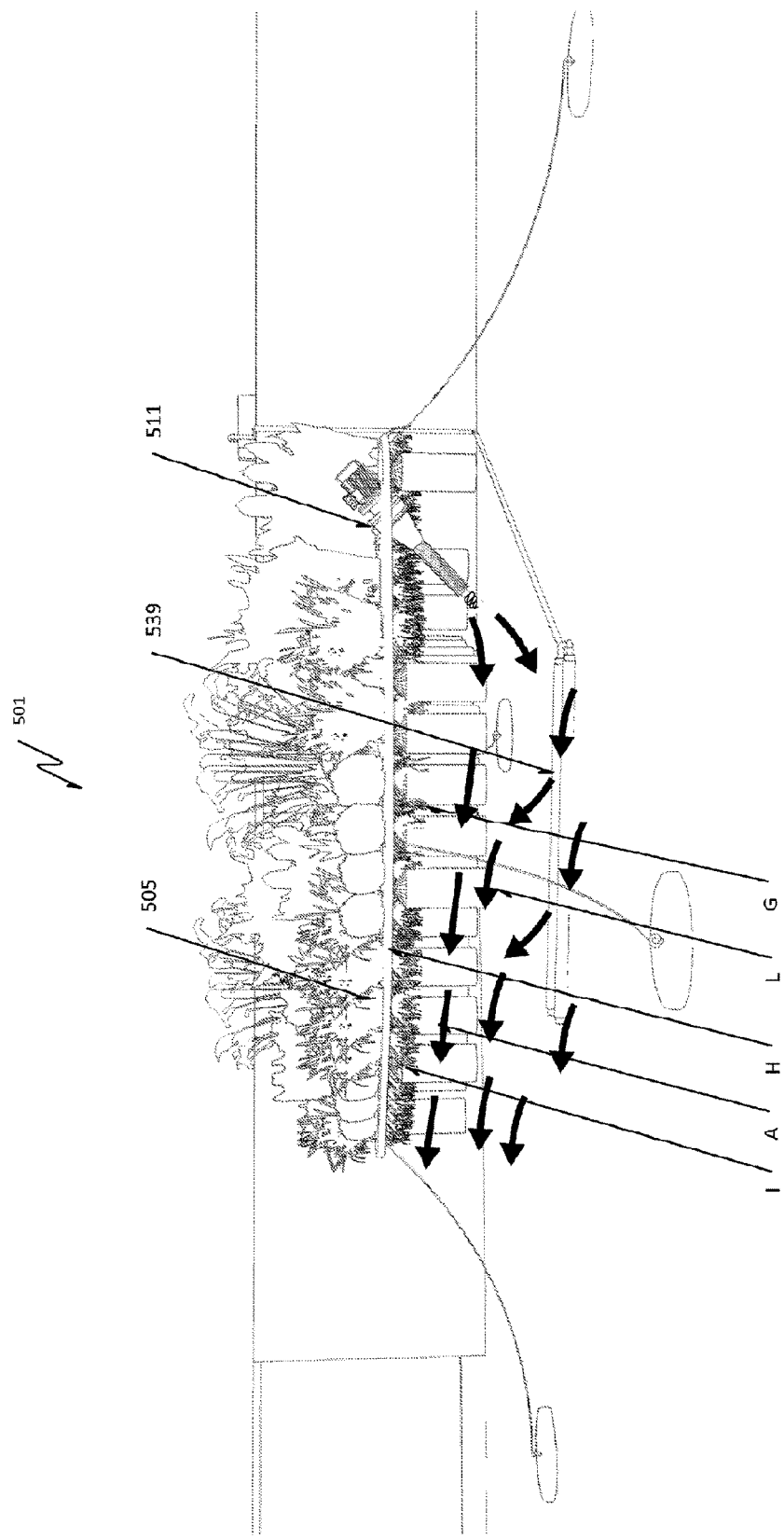
Figure # 17

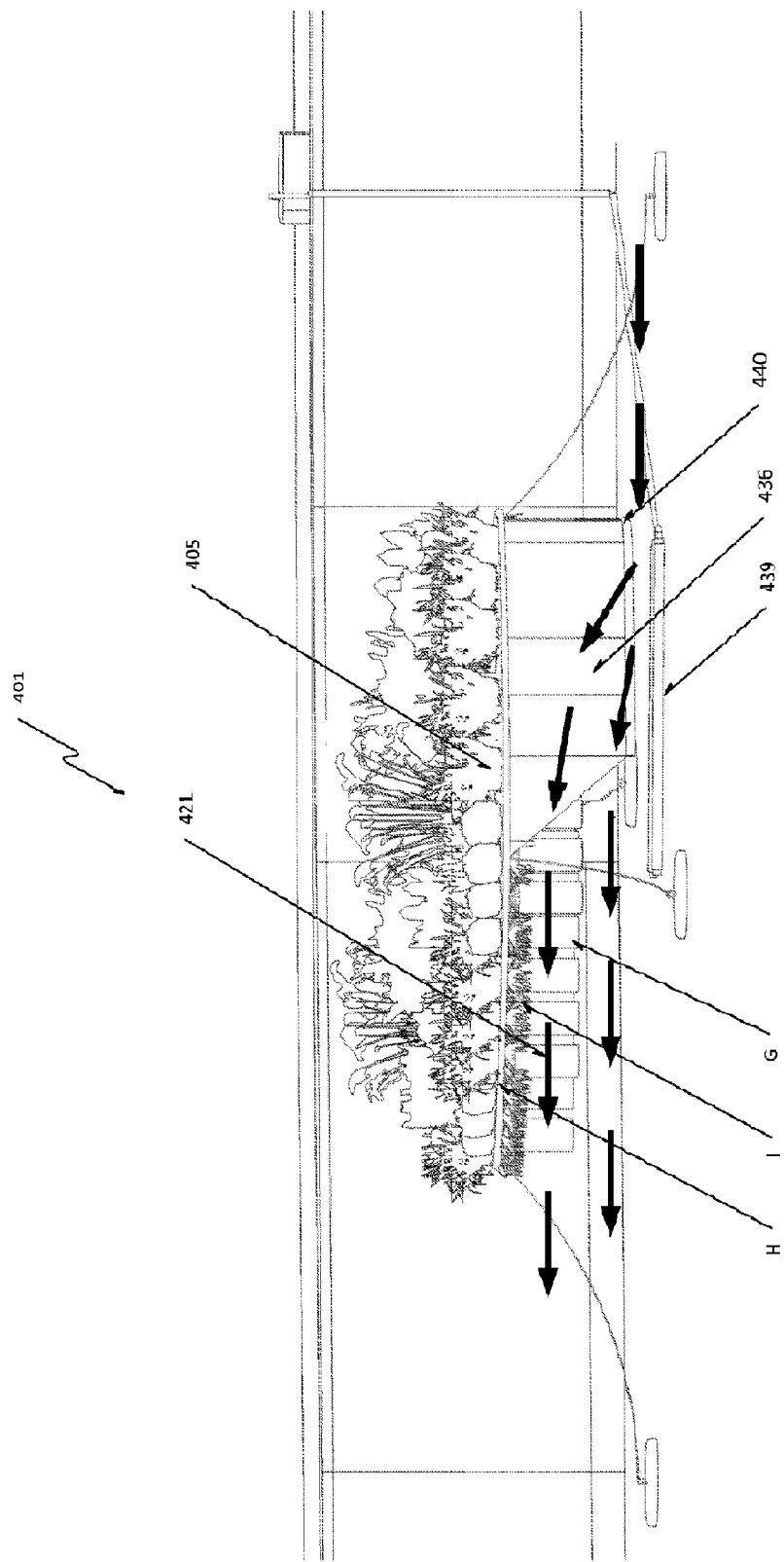
Figure #18

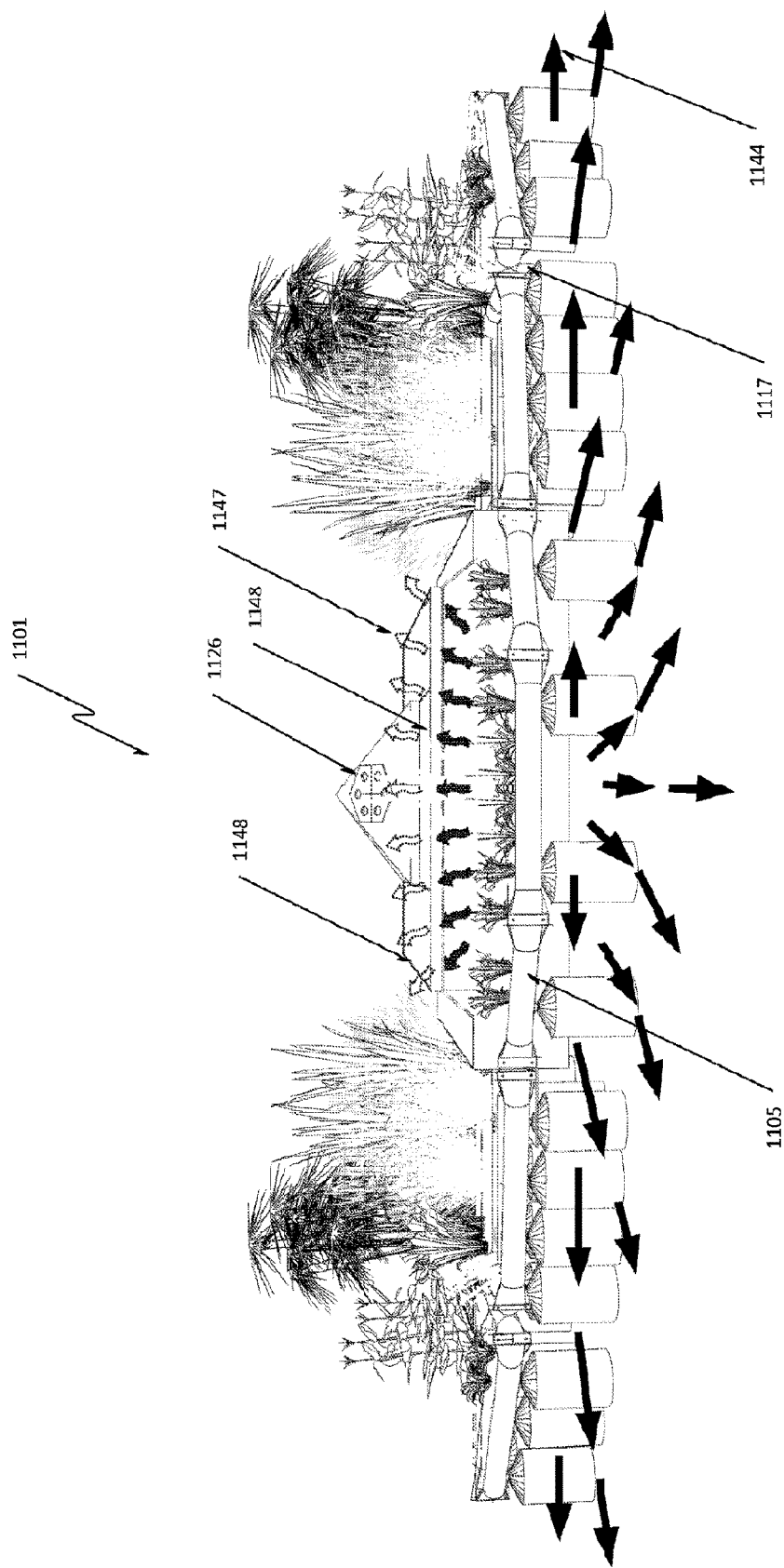
Figure #19

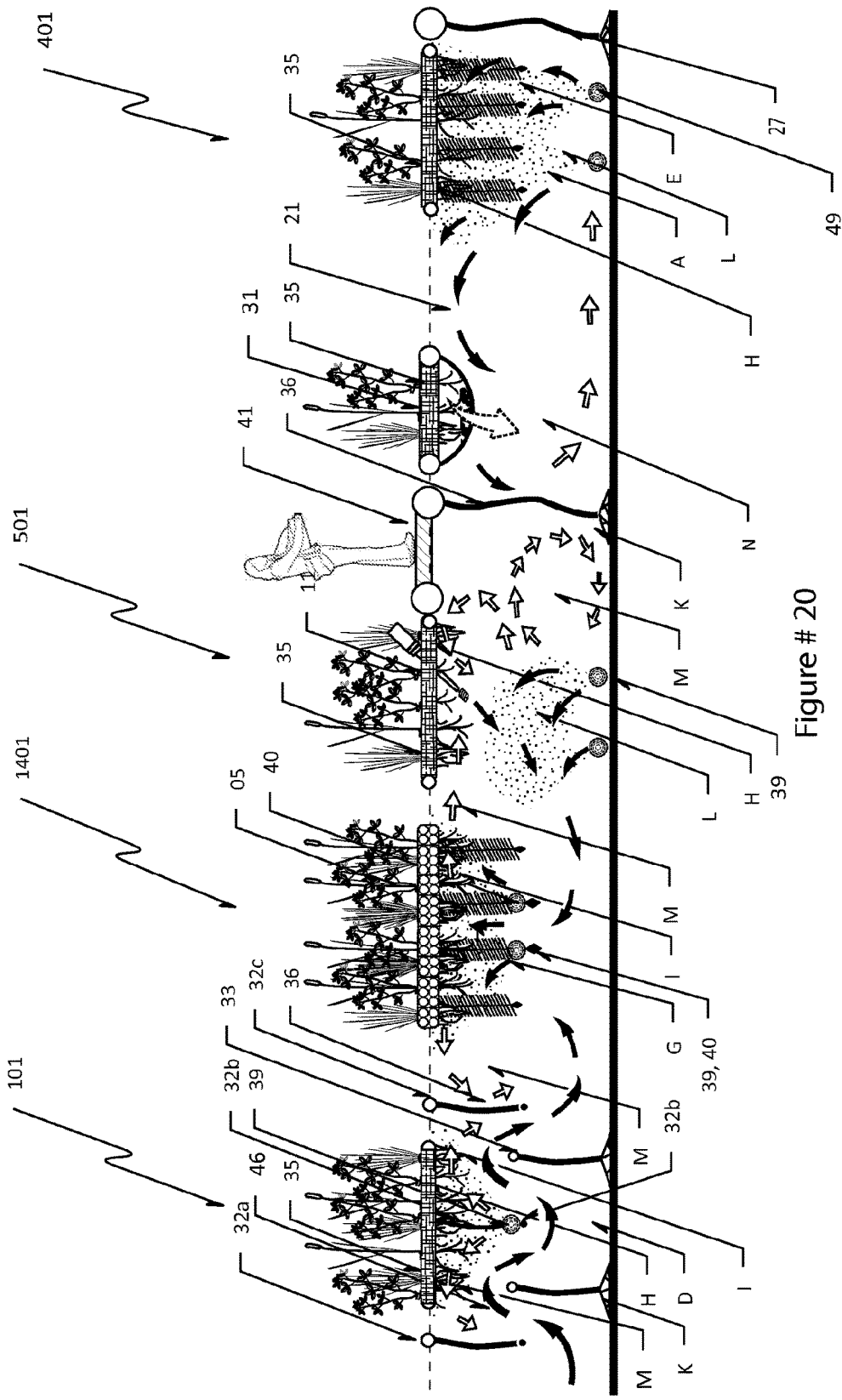
Figure # 20

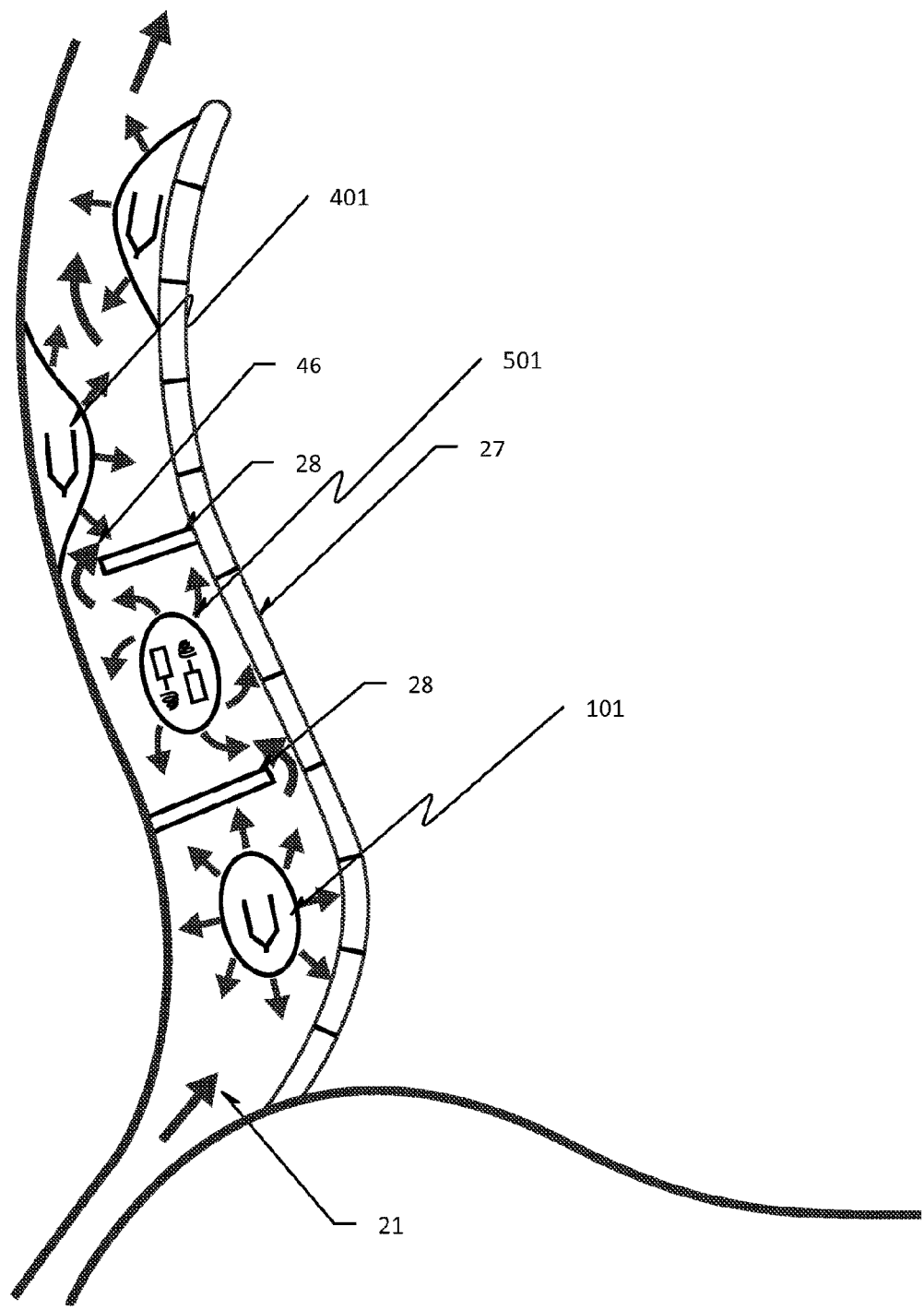
Figure #21

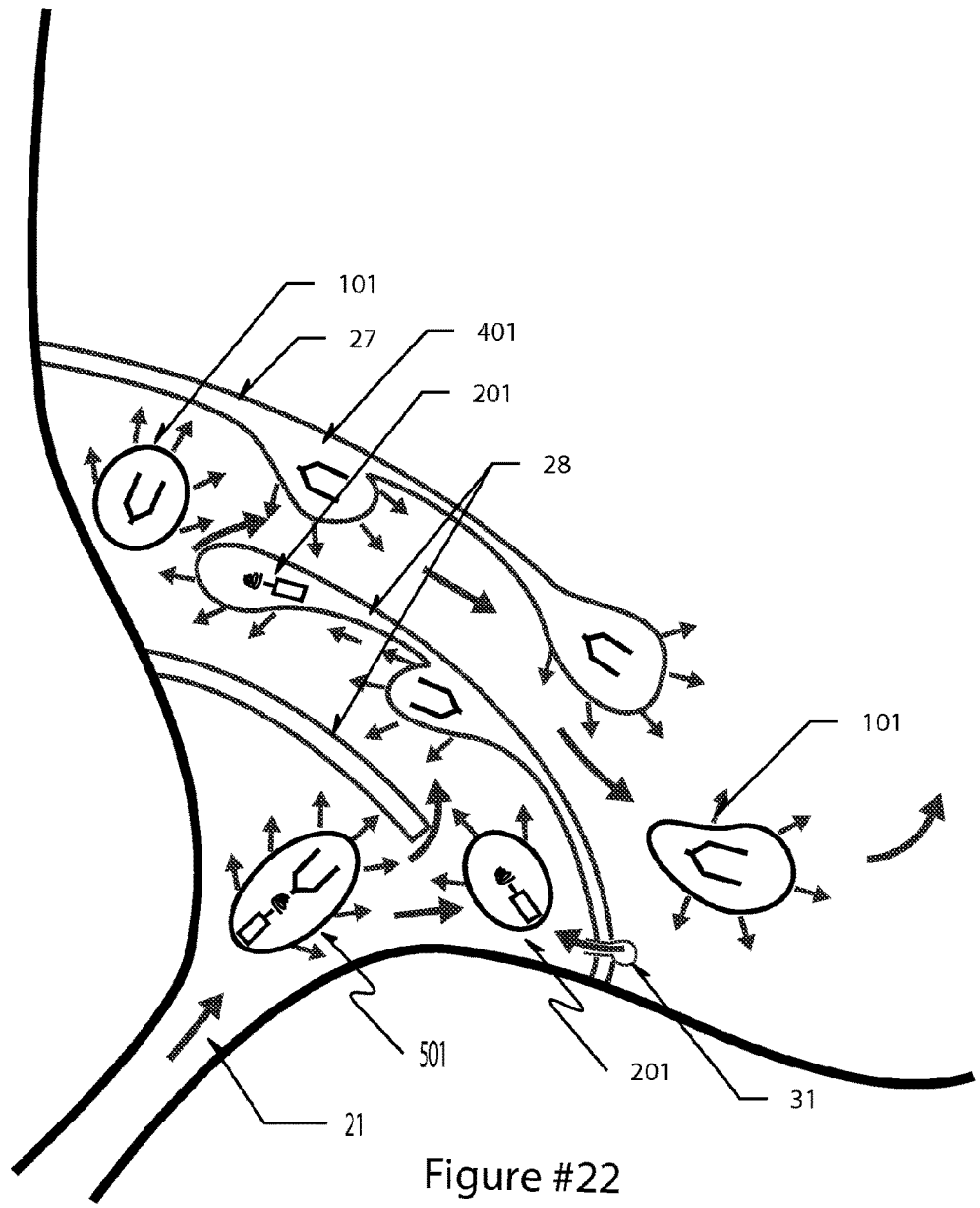
Figure #22

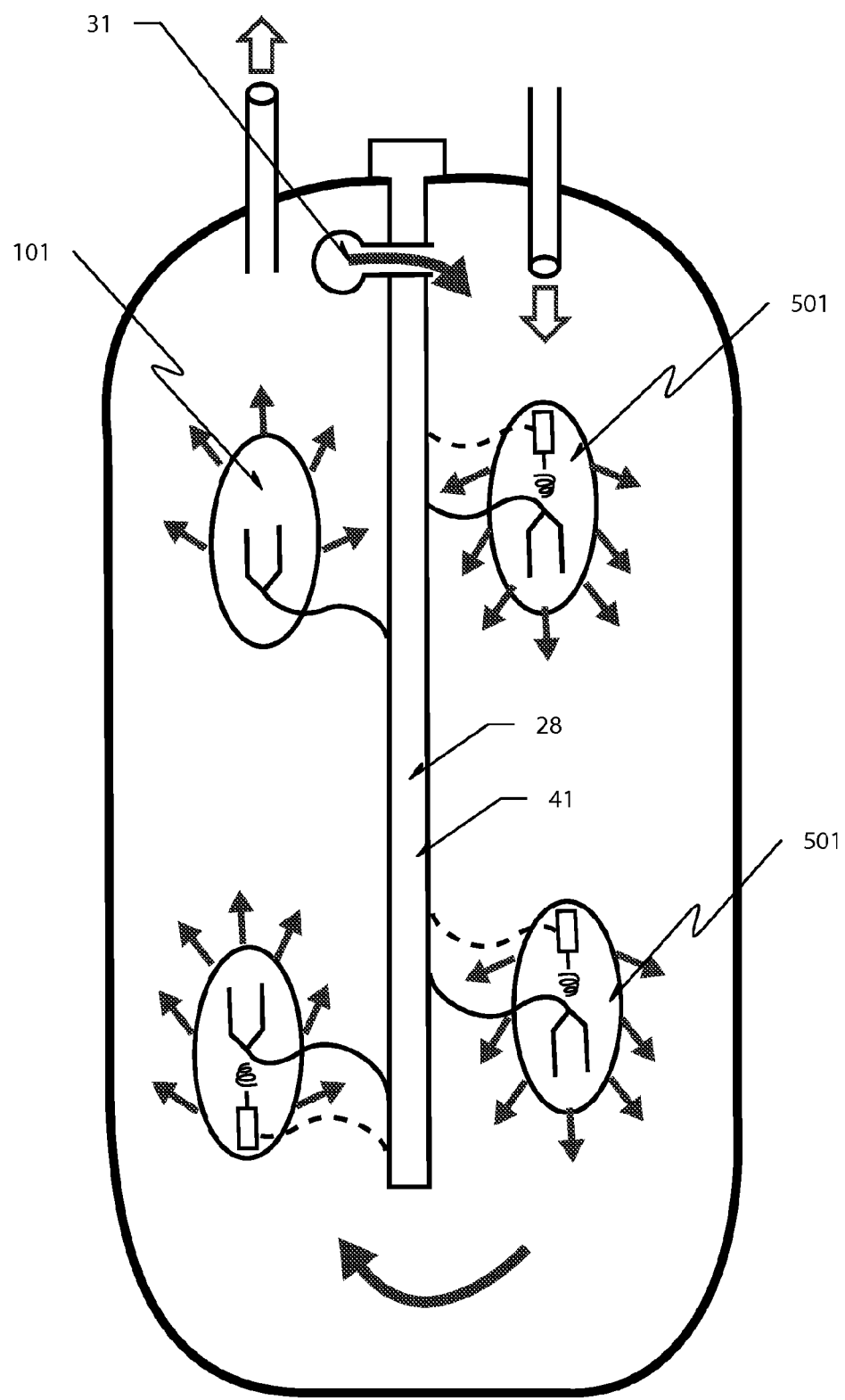
Figure #23

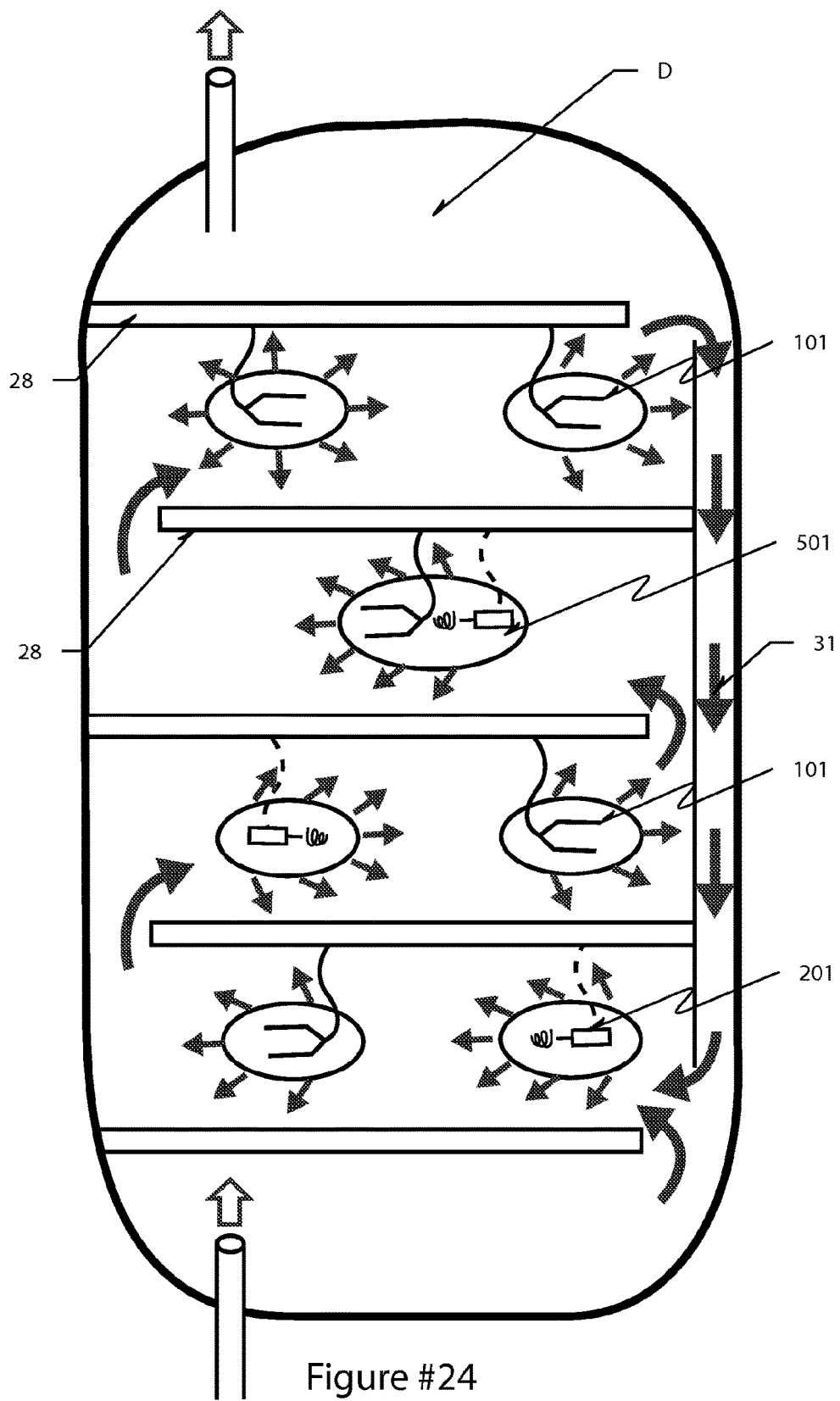
Figure #24

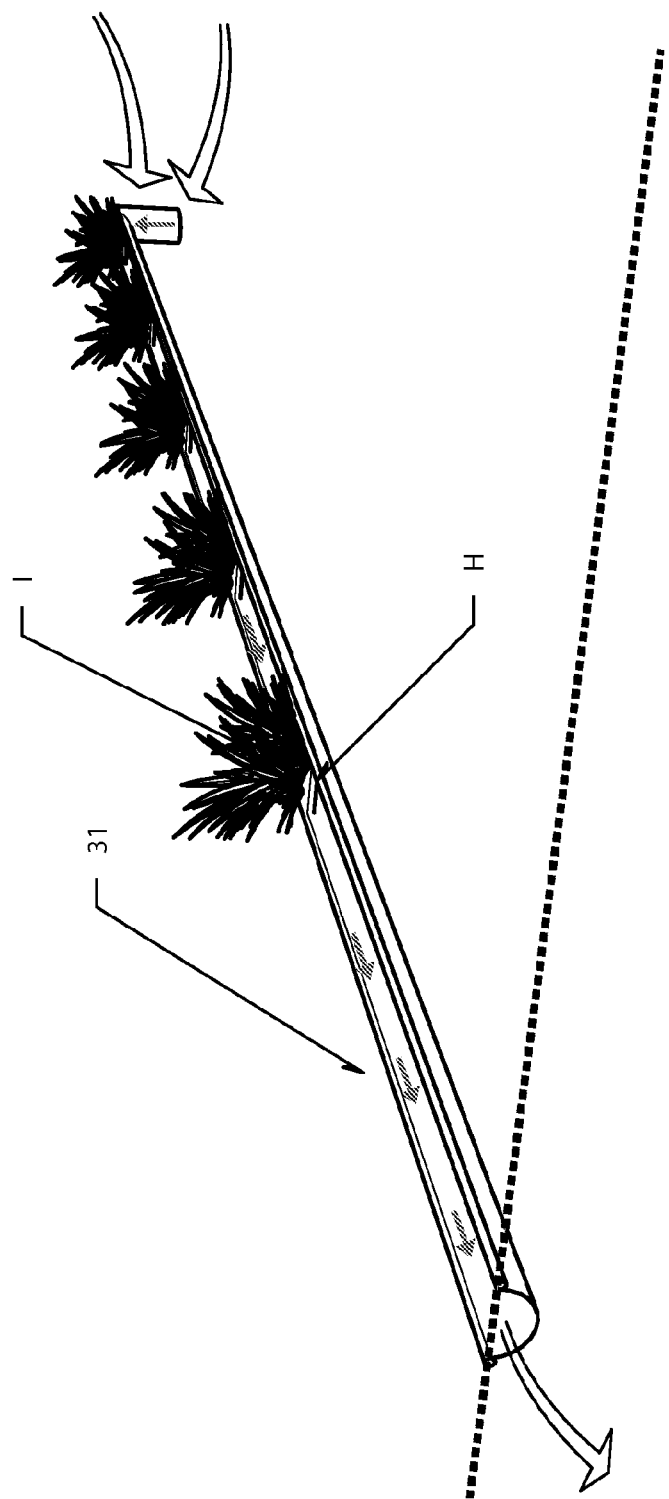
Figure #25

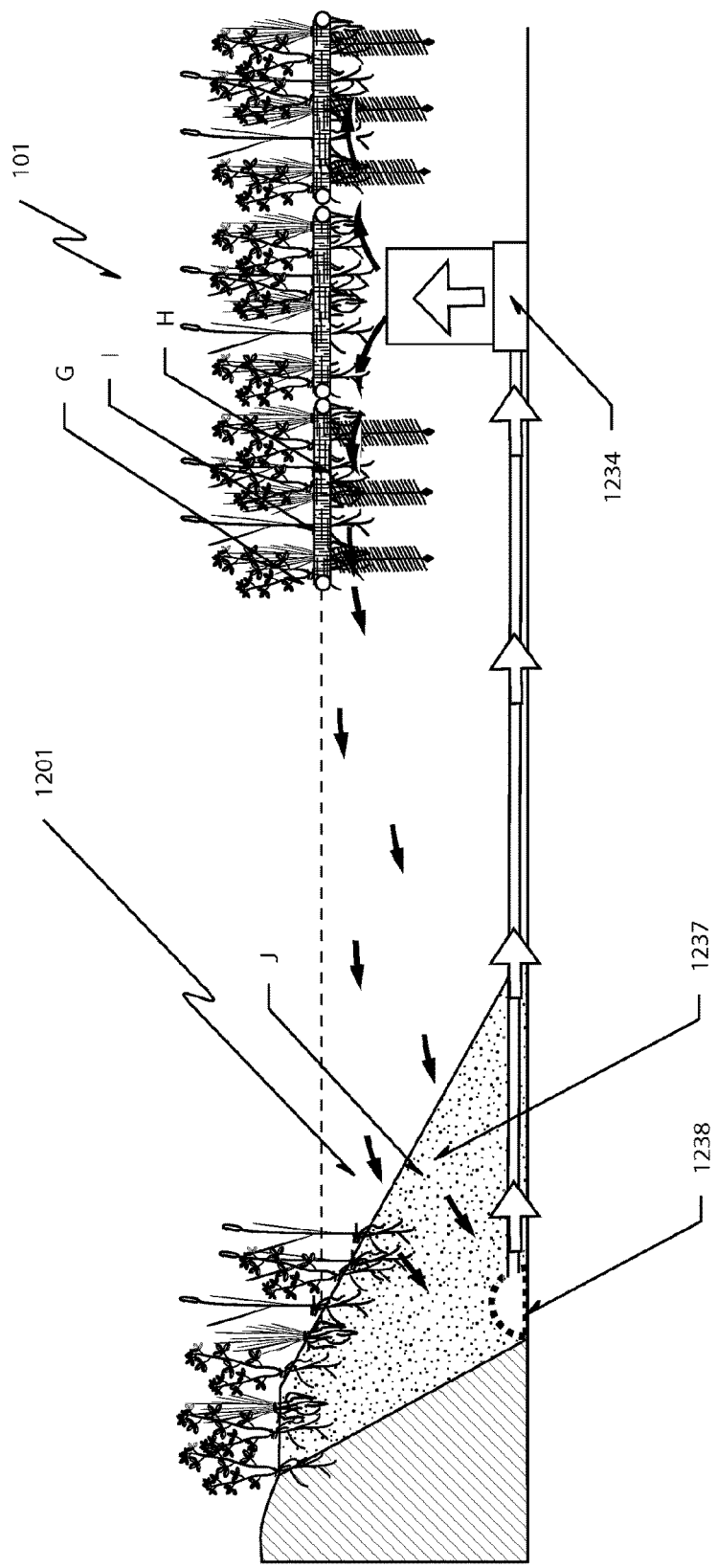
Figure #26

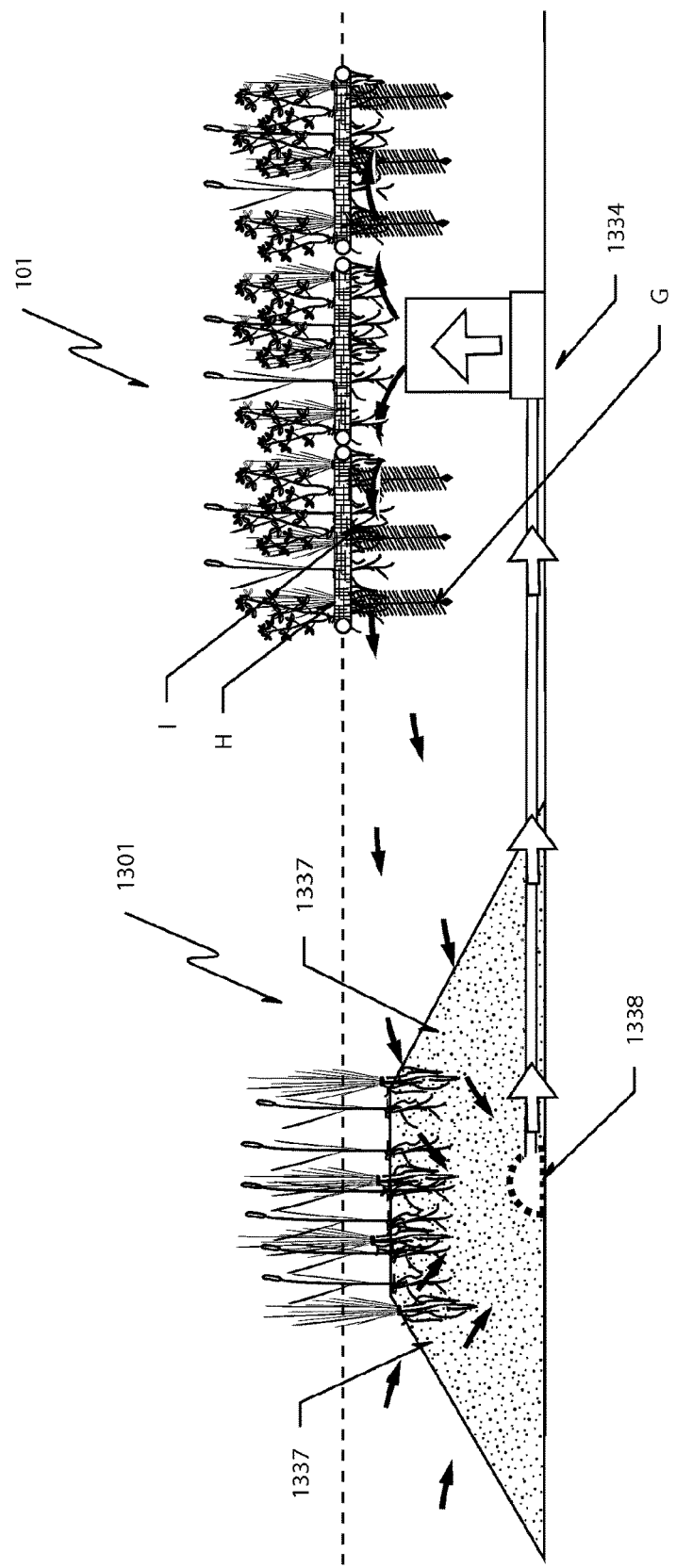
Figure #27

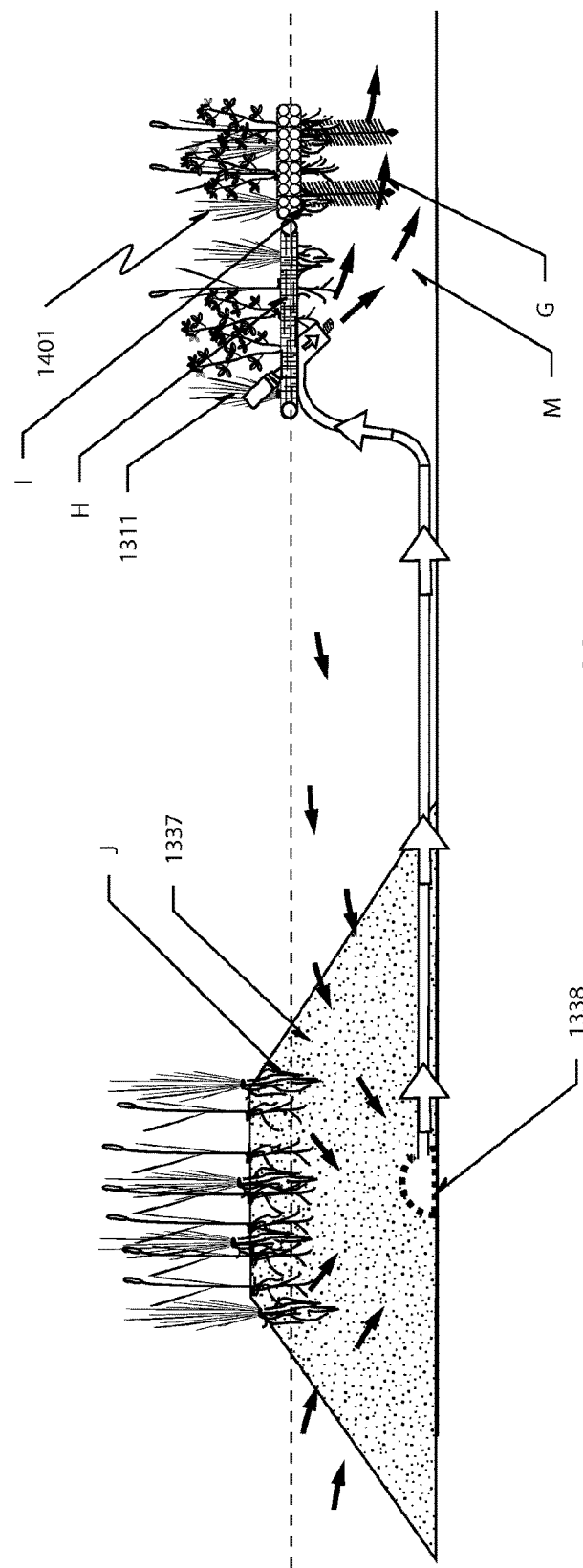
Figure #28

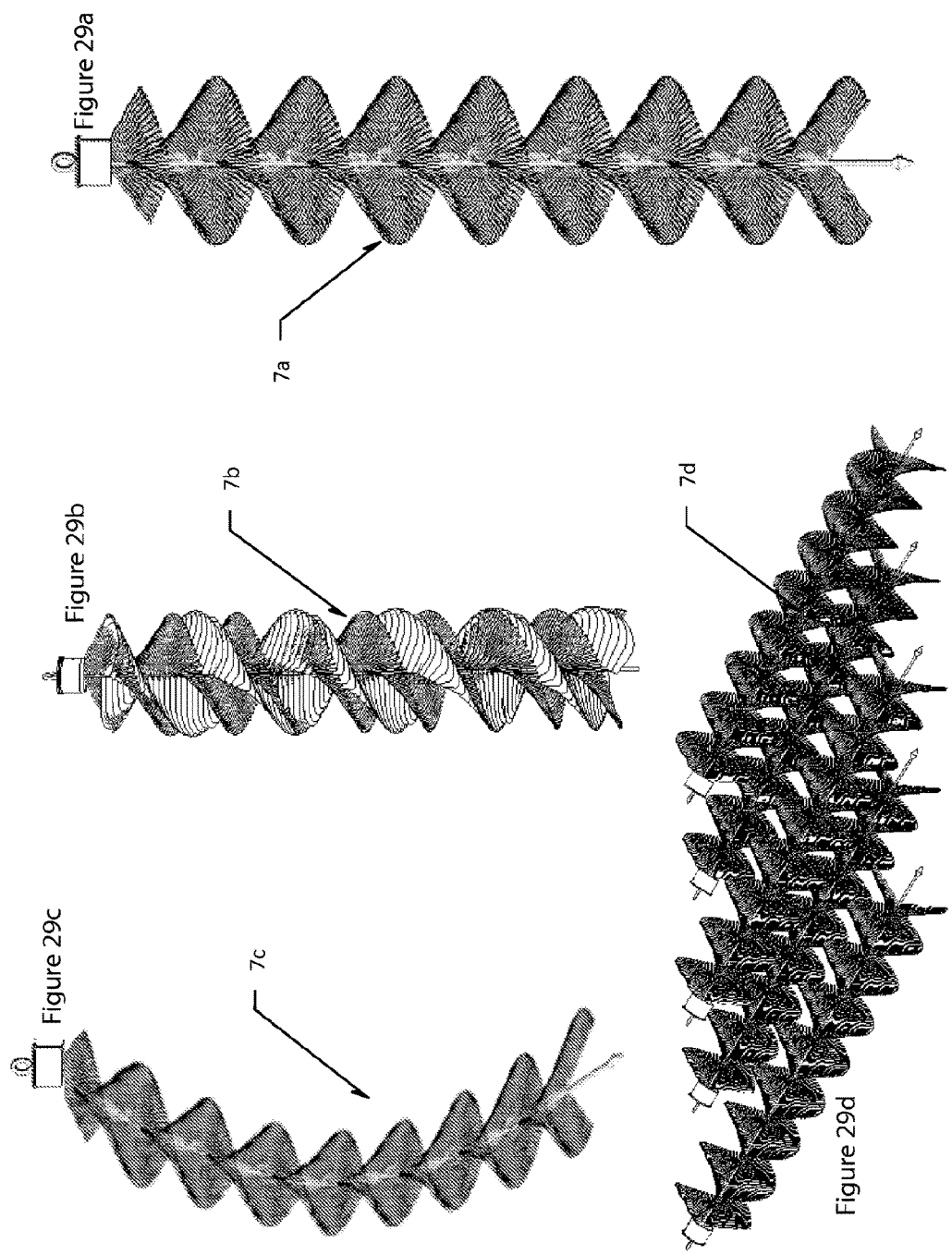

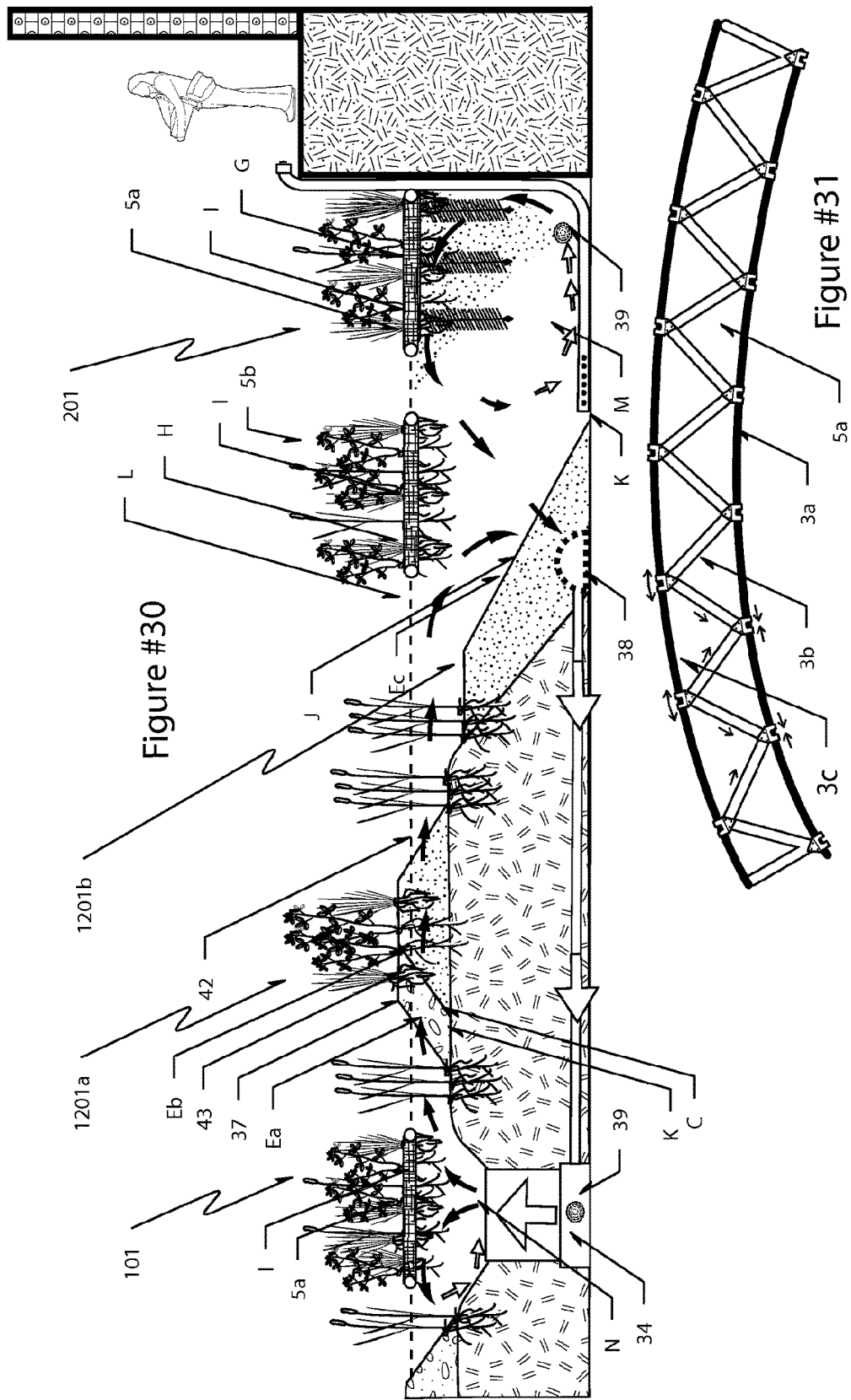

INTEGRATED WATER TREATMENT SYSTEM

The present invention relates to the field of water treatment. More specifically, the present invention relates to water treatment systems, and in particular provides an integrated water treatment system, and arrangements of such water treatment systems, suitable for use in the treatment of contaminated water, wastewater, aquaculture, potable water, industrial water as well as polluted water bodies.

BACKGROUND TO THE INVENTION

More than 80% of sewage in developing countries goes un-treated. Furthermore, millions of businesses contribute to water pollution in both urban and industrial centres. Water contamination is recognised as a global problem; fresh water resources can be jeopardised—and may already be limited—and there are environmental concerns too such as degradation of coastal waters and estuaries.

The challenge of treating wastewaters with new treatment plants is substantial and is well known in the field. The known challenges include: installing pipe works and sewage systems to convey contaminated water to treatment plants, the high cost of land for treatment plants near urban and industrial centres, and the cost of building the large containment vessels or controllable reactor volumes to house the treatment process. These costs are often significantly higher than the actual cost of treatment equipment systems.

It is therefore an object of embodiments of the present invention to obviate or mitigate one or more of the disadvantages of the prior art.

SUMMARY OF THE INVENTION

According to a first aspect of the invention, there is provided an integrated water treatment system for use in the treatment of contaminated water and the like, the system comprising;
  at least one module adapted to float in a body of water;
  at least one attached growth media element disposed upon the at least one module for suspension in the body of water; and
  at least one aeration device suspended from the at least one module for aerating the body of water;
  wherein the at least one aeration device is arranged to generate at least one water flow path; and
  wherein the at least one attached growth media element is disposed within the at least one water flow path.

Preferably, the at least one aeration device comprises a multi-directional aeration device configured to generate water flow paths in a plurality of directions. Alternatively, or additionally, the at least one aeration device comprises a directional aeration device configured to generate one or more water flow paths in substantially a single direction. Optionally, the at least one aeration device comprises a deflector plate, or housing to direct flow.

Preferably, the at least one module comprises a buoyant structure or platform.

Most preferably, the buoyant structure consists of a framework comprising three or more buoyant members connected at their ends. The buoyant members may comprise lengths or sections of pipe which can be sealed through a number of methods.

Most preferably, the buoyant members are thermally fused or welded so as to provide a flange by which the members may be connected to one another. Advantageously, the flange is angled. Such connection may be in a wide variety of forms—for example, by means of a curved bracket.

Most preferably, the buoyant members are arranged such that the flanges are vertically oriented, and bent to a pre-specified angle. Specialized tooling for this purpose allows the flanges to be sealed or thermally angle welded and permanently sealed at a pre-set angle in a single process. This process allows larger diameters to be utilized than has previously been possible. In particular, it is found that pipe diameters greater than about 125 mm require an integrated angle welding process in order to main integrity and angle. This process allows large diameter, bent and vertical flange buoyancy structures that form the structure of the treatment system, adding additional buoyancy.

Optionally, or alternatively, the buoyant members are connected by one or more welded compound angles, providing fused and structurally sound connecting flanges which may be set to a pre-determined angle on both the horizontal and vertical axis.

Furthermore, this allows increased flexibility in the system, and also allows integration with additional system features requiring higher buoyancy and structural rigidity, such as walkways, boat access landings, wildlife habitat features, as well as heavier aeration and circulation equipment.

Alternatively, or additionally, the buoyant structure or platform comprises layered marine foam and a semi-structural mesh, with an optional protective containment wrapping and media support material. According to this embodiment, the supporting mesh may be welded, clipped or laced so as to encompass and protect the flotation foam material.

Optionally, the at least one attached growth media element comprises a live substrate. For example, it may comprise the roots of aquatic plants. Alternatively, the at least one attached growth media element comprises an artificial substrate. For example, it may comprise spiralling columns or curtains. Most preferably, the at least one attached growth media element comprises both a live substrate and an artificial substrate.

Preferably, the system comprises a plurality of attached growth media elements. Most preferably, the plurality of attached growth media elements are arranged to cooperate with at least one water flow path. Optionally, the attached growth media elements comprise one or more curtains arranged to channel at least one water flow path.

Optionally, the system further comprises one or more foam baffles configured to collect and re-incorporate generated foam in to the water flow generated by the at least one aeration device. Optionally, the system further comprises one or more air inlets to provide an air flow to the aeration device.

Optionally, the at least one aeration device is suspended from the at least one module by an adjustable mount. Preferably, the adjustable mount is adapted to vary the depth and/or flow angle of the aeration device.

Preferably, the system comprises a plurality of interconnected modules adapted to float in a body of water. Preferably, the modules are pivotally connected by one or more connection means.

Optionally, the at least one module comprises a support mesh. Optionally, the support mesh comprises Triax.

Optionally, the system further comprises a lockable cover to prevent unauthorised access to the aeration and circulation device. Alternatively, or additionally, the cover is a low profile cover. Optionally, the system further comprises anchoring means. Optionally, the anchoring means is repositionable.

Optionally, the system further comprises a hollow structural cover mounted upon the at least one module and wherein the aeration device is housed within the hollow structural cover.

The above arrangement provides a system wherein the hollow structural cover significantly reduces the noise and effects of aerosols produced by the aerator thus making the apparatus more flexible with respect to the areas within which it may be deployed. For example, such a system may be installed in close proximity to dwellings or work spaces.

Optionally, the hollow structural cover comprises a growth medium, optionally an ecological growth medium, comprising one or more layers. Inclusion of the ecological growth medium acts to further reduce the noise and effects of aerosols produced by the aerator. This medium also provides a more attractive visual appearance to the reactor again allowing it to be deployed in a greater number of locations.

The one or more layers may comprise one or more layers selected from the group comprising a supporting layer, a moisture conveying or moisture wicking substrate, an organic lignin based fibrous matting, a fibre re-enforced soil of peat or bark or compost, a moisture retaining layer, and a particulate filtration layer.

Such a layer selection may provide additional benefit through biofiltration of malodorous gasses (such as hydrogen sulphide, ammonia, and mercaptons) and the like released inside the cover as the water being treated undergoes transition from anaerobic or anoxic to aerobic conditions.

According to a second aspect of the invention, there is provided an integrated water treatment system for use in the treatment of contaminated water and the like, the system comprising;
  at least one module adapted to float in a body of water;
  at least one attached growth media element disposed upon the at least one module for suspension in the body of water; and
  an aeration device disposed upon the at least one module for aerating the body of water;
  wherein the aeration device is a multi-directional aeration device configured to generate water flow paths in a plurality of directions; and
  wherein the at least one attached growth media element is disposed within at least one of the water flow paths.

Optionally, the multi-directional aeration device comprises a diffuser.

Optionally, the system further comprises a directional mixer, or other flow generating device.

According to a third aspect of the invention, there is provided an integrated water treatment system for use in the treatment of contaminated water and the like, the system comprising;
  at least one module adapted to float in a body of water;
  at least one attached growth media element disposed upon the at least one module for suspension in the body of water; and
  an aeration device disposed upon the at least one module for aerating the body of water;
  wherein the aeration device is a directional aeration device configured to generate one or more water flow paths in substantially a single direction; and
  wherein the at least one attached growth media element is disposed within at least one of the water flow paths.

According to a fourth aspect of the invention, there is provided an integrated water treatment system for use in the treatment of contaminated water and the like, the system comprising;
  at least one module adapted to float in a body of water;
  at least one attached growth media element disposed upon the at least one module for suspension in the body of water; and
  a first aeration device and a second aeration device disposed upon the at least one module for aerating the body of water;
  wherein the first aeration device is a multi-directional aeration device configured to generate water flow paths in a plurality of directions;
  wherein the second aeration device is a directional aeration device configured to generate one or more water flow paths in substantially a single direction; and
  wherein the at least one attached growth media element is disposed within at least one of the water flow paths.

Advantageously, the first aeration device comprises a diffuser.

Combinations of directional and multidirectional aeration and flow components offer considerable advantage and process benefits. In such a configuration, the directional aerator and the multi-directional aerator are integrated in a single system. The directional aerator may be located so as to direct flow towards the multi-directional aerator, or alternatively to draw water from it. A multi-directional aerator can typically deliver a greater volume of air to the water however the directional system can typically better propel the aerated water, thus increasing the potential contact time before air bubbles reach the surface and thus increasing oxygen transfer capacity. By combining these aerators in proximity or as one unit, both increased air delivery and longer contact time with media and water, are achieved resulting in surprisingly increased treatment capacities.

Embodiments of the second to fourth aspects of the invention may include one or more features of the first aspect of the invention or its embodiments, or vice versa.

According to a fifth aspect of the present invention, there is provided a module adapted for use in the integrated water treatment system of any of the first to fourth aspects.

According to a sixth aspect of the present invention, there is provided an attached growth media element adapted for use in the integrated water treatment system of any of the first to fourth aspects.

According to a seventh aspect of the present invention, there is provided an aeration device adapted for use in the integrated water treatment system of any of the first to fourth aspects.

Embodiments of the fifth to seventh aspects of the invention may include one or more features of the first aspect of the invention or its embodiments, or vice versa, and may be arranged in a re-configurable system.

According to an eighth aspect of the present invention, there is provided a plurality of integrated water treatment systems or modules according to the first aspect of the present invention disposed within a body of water.

Preferably, the plurality of integrated water treatment systems or modules are arranged so as to circulate water therebetween. Optionally, the plurality of integrated water treatment systems are arranged so as to define zones of fully and/or partially treated water. Optionally, the plurality of integrated water treatment systems are arranged so as to define zones where suspended solids are settled Preferably, the integrated water treatment systems are spaced so as to provide denitrification zones. Optionally, the plurality of integrated water treatment systems are arranged to provide a plurality of processing loops. Preferably, at least one of the integrated water treatment systems is configured to transfer water from one processing loop to another.

Optionally the integrated water treatment systems are configured to operate according to a predetermined schedule. Alternatively, the plurality of integrated water treatment systems are configured to operate in response to one or more measured or determined values.

Embodiments of the eighth aspect of the invention may include one or more features of the first aspect of the invention or its embodiments, or vice versa.

According to a ninth aspect of the present invention, there is provided a water treatment system as defined by claim 1. Preferable and optional features of the water treatment of the ninth aspect are defined by the corresponding dependent claims.

In an exemplary embodiment of the ninth aspect of the present invention, there is provided a multi stage integrated ecological water treatment system for the use in the treatment of contaminated water, the system comprising;

a series of at least two semi flexible treatment modules adapted to float in a body of water;
 wherein the treatment modules are semi-flexible on the horizontal plane allowing at least 225 mm vertical movement over a 10,000 mm horizontal span;
 wherein the at least two treatment modules are configured, to interact with each other positioned in proximal relation or contiguously interlinked providing a multi stage series of modules and treatment phases;
 a first type of attached biofilm growth treatment media with a surface area of at least 65 m2 per Cubic Meter;
 wherein the media consists of the submerged roots of a first species of emergent aquatic plant selected to provide a root surface area, greater than at least 65 m2 per cubic meter;
 a second type of attached growth treatment media with a surface area of at least 45 m2 per Cubic Meter;
 wherein the media consists of the submerged roots of at least a second species of emergent aquatic plant selected to provide a root surface area, greater than at least 45 m2 per cubic meter;
 a third type of attached growth treatment media, with a surface area of at least 12 m2 per Cubic Meter;
 wherein the third type of attached growth media is integrated with the plant-supporting structure comprising one or more layers of elongate elements of a woven, non-woven or cross linked type such as fibres meshwork, with a surface area of at least 12 m2 per cubic meter;
 at least one oxygenation element,
 wherein oxygenation may be achieved through the use of any suitable aeration device; diffuser, mechanical aerator, or venturi pump, so as to provide a field oxygen transfer rate of at least 0.80 Kg/O2/Kwh and preferably at least 1.5 Kg/O2/Kwh up to 4.5 Kg/O2/Kwh or greater;
 wherein the oxygenation element is disposed in consort with the circulation system, so as to provide oxygenated water flow paths which consistently contact the at least three types of attached growth treatment media;
 at least one multi directional circulation and re-circulation flow path
 wherein the multi directional circulation flow is configured, so as to generate a multi-directional flow through and across the at least three types of attached growth treatment media and to provide both macro and micro scale recirculation effects such that at the macro scale at least 10% of the total 24 hour circulation flow is re-circulated through at least 20% of the overall system, and wherein at the micro scale at least 5% of the overall circulation flow is recirculated through at least 10% of the overall system, and wherein the macro recirculation flow, may contain several micro recirculation flow paths and wherein the circulation system, may be a part of the oxygenation system or a series of directional flow elements, arranged in multiple directions;
 at least one directional flow path,
 wherein the at least one directional flow path may comprise flow generated by a sub-surface mixer, a directional mechanical aerator or a directional airlift circulator wherein a compressed air is dispersed within an enclosing shroud having a directional outlet, or in proximity to an directing containment, such as a peripheral edge of a water body, so as to force the rising water, outwards in a generally 180 degree directional flow path;
 a series of at least two ecological treatment zones incorporating complementary processes with different levels of dissolved oxygen, macro and micro scale circulation and re-circulation flows, and at least two types of biofilms supporting different attached microbiological communities, characterized by those which favour live substrate media, and those which favour non-living media,
 wherein the series of ecological treatment zones, supports a broad ranging bio diversity of aquatic organisms including producers, grazers, predators and higher plants and animals providing complex metabolic pathways wherein pollutants are moved up the food chain reducing their volume, and wherein diverse microbial processes provide a wide spectrum of reactors capable efficiently stabilising and treating a broad spectrum pollutants.

The skilled person will realise that any of the above-mentioned features may be omitted or replaced with equivalent features.

Embodiments of the ninth aspect of the invention may include one or more features corresponding to features of any of the first to eighth aspects of the invention or their embodiments, or vice versa.

BRIEF DESCRIPTION OF THE DRAWINGS

There will now be described, by way of example only, various embodiments of the invention with reference to the drawings, of which:

FIG. 1 illustrates a plan view of a floating water treatment system in accordance with an embodiment of at least one aspect of the present invention;

FIG. 2 illustrates a perspective view of the floating water treatment system illustrated in FIG. 1;

FIG. 3 illustrates a perspective side view from slightly below a floating water treatment system in accordance with an alternative embodiment of at least one aspect of the present invention;

FIG. 4 illustrates a plan view of a floating water treatment system in accordance with another alternative embodiment of at least one aspect of the present invention;

FIG. 5 illustrates an enlarged side view from slightly above the floating water treatment system illustrated in FIG. 4;

FIG. 6 illustrates a top down perspective view of a floating water treatment system in accordance with a further alternative embodiment of at least one aspect of the present invention;

FIG. 7 illustrates a cross-sectional side view of the floating water treatment system illustrated in FIG. 6;

FIG. 8 illustrates a floating water treatment system in accordance with a yet further alternative embodiment of at least one aspect of the present invention;

FIG. 9 illustrates a top down view of a floating water treatment system in accordance with a yet further still alternative embodiment of at least one aspect of the present invention;

FIG. 10 illustrates a side view of the floating water treatment system illustrated in FIG. 9;

FIG. 11 illustrates in schematic form a deployment of floating water systems according to one or various embodiments of aspects of the present invention;

FIG. 12 illustrates in schematic form an alternative deployment of floating water systems according to one or various embodiments of aspects of the present invention;

FIG. 13 illustrates in schematic form a further alternative deployment of floating water systems according to one or various embodiments of aspects of the present invention;

FIG. 14 illustrates in schematic form a yet further deployment of floating water systems according to one or various embodiments of aspects of the present invention;

FIG. 15 illustrates in schematic form an array of frameworks having supporting braces;

FIG. 16 illustrates in schematic form a folding framework;

FIG. 17 illustrates in schematic form a side view of system containing both multi directional diffused and directional aeration circulators;

FIG. 18 illustrates in schematic form an element of the present invention where multi directional flow diffusers are contained within a flexible textile shroud which channels the water to provide a directional flow through several biofilm treatment zones;

FIG. 19 illustrates in schematic form an element of the present invention, incorporating a planted multi-layer soil plant root endogenous carbon bio-filter cover installed over the aeration section;

FIG. 20 shows in schematic form a section view of an embodiment of the system illustrating the synergistic effects of multiple re-configurable treatment zones, mimicking the flows and processes of a natural waterway;

FIG. 21 illustrates in schematic form a plan view, of the present invention where the system is installed at the edge of a water body, and is configured so as to intercept pollution entering the water body from a side tributary, or influent source, such as a stream, pipe, or combined sewage storm water overflow point;

FIG. 22 illustrates in schematic form a plan view, of an embodiment of the present invention where the system is installed at the edge of a water body, and is configured so as to intercept pollution entering the water body from a side tributary, or influent source, such as a stream, pipe, or combined sewage storm water overflow point for example, as in FIG. 21, with treatment zones, as exemplified in FIG. 20;

FIG. 23 illustrates in schematic form plan view example of the present invention, as installed within lagoon, pond or other containment;

FIG. 24 illustrates in schematic form a plan view of an example of the present invention, as installed within lagoon, pond or other containment body;

FIG. 25 illustrates in schematic form a perspective view of a detail of one embodiment of the recirculation channel shown in plan view in FIG. 24, and in section view in FIG. 20 as a floating conveyance channel;

FIG. 26 illustrates in schematic form a section view of an example of the present invention, wherein a subsurface gravel embankment at the edge of a water body is connected to one or more large diameter air lift tubes situated in proximity to a series of floating modules;

FIG. 27 illustrates in schematic form a similar embodiment to that shown in FIG. 26, but where the influent gravel filter is disposed within the water body as a subsurface mound;

FIG. 28 in schematic form a similar system to that shown in FIG. 27, in which a directional aerator circulator or propeller pump is used rather than an airlift;

FIG. 29 shows a detail of a preferred embodiment of an attached growth treatment element as it is deployed within the system;

FIG. 30 illustrates a section view of the present invention, wherein the system is integrated with an extended area of waterscape and wetland edge integrated elements; and FIG. 31 shows a floating module of an embodiment of the present invention in plan view as a curved module adjustable on site to conform to the waterway bends.

DETAILED DESCRIPTION OF PREFERRED EMBODIMENTS

FIG. 1 illustrates a plan view of a floating water treatment system 1 in accordance with an embodiment of at least one aspect of the present invention.

The system 1 can be seen to comprise six flotation platforms 5, each platform 5 individually structurally braced by means of framework 3. From each platform 5 is suspended a number of attached growth media elements 7 (visible in perspective view in FIG. 2). The platforms 5 are hexagonal (although any manner of shape could be employed e.g. round, square, triangular, rectangular, parallelogram etc. dependent on functional and/or aesthetic requirements). Furthermore, these platforms are modular, which means that the system can be broken down and/or constructed into/from smaller parts (easing storage, shipping etc.) and expanding the range of locations where the system can readily be installed to improve water quality and provide treatment.

The media platforms 5 are disposed around a central platform 9 from which is suspended a multi-directional aerator (not visible in FIG. 1 or FIG. 2, but corresponding feature visible in FIG. 3, reference numeral 111). Arrows 21 indicate generally the flow from the aerator.

In this example, the attached growth media elements (shown schematically by reference numeral 7) are engineered but it will be understood that they may be engineered (for example, brush, curtain, spiral, leave, feathered, strips, etc.), natural (for example, living plants and roots, etc.) or indeed a combination of both or several types of media. In this embodiment, the media elements 7 are installed in a radial configuration.

Platform 5a is a modified platform 5 incorporating a tensioned supporting mesh 13 from which the engineered media 7 may be hung. Tensioning support mesh 13 may also (or alternatively) support planted ecologies, for example to establish a high volume of root mass as live substrate attached growth treatment media. A three directional mesh is shown and may, for example, comprise Triax, as manufactured by Tensar. The mesh 13 may be tensioned adding to the overall strength of the platform 5*a* and/or system 1. Of course, other meshes or supporting grids may be used.

Each framework 3 consists of six individual structural buoyant members each consisting, in this embodiment, of internally heated and sealed or thermally angle welded sections of plastic pipe. Each seal or weld provides a vertical flange, and said vertical flanges are connected to produce a framework 3. In this way, custom floating structures of variable buoyancy and complex design may now be achieved while maintaining strength. In applications requiring higher buoyancy and increased durability, larger diameter pipes with greater wall thickness can be used for either greater flotation or greater strength.

A secured and lockable cover 15 is also shown. The cover 15 prevents unauthorised access to the aerator, associated control apparatus etc. and to the underside of the floating water treatment system 1.

In FIG. 2, live substrate attached growth treatment media in the form of living ecologies and/or plant roots are generally indicated by reference numeral 17, suspended from the mesh 13.

FIG. 3 shows a perspective side view from slightly below a floating water treatment system 101 in accordance with an alternative embodiment of at least one aspect of the present invention. Like reference numerals may be assumed to refer to like features.

In this embodiment, natural attached growth media rather than engineered media is shown, indicated generally by reference numeral 117. As stated above, it is foreseen that the system 101 may employ natural, engineered or a combination of both media types.

As in FIG. 1, FIG. 3 illustrates a system 101 comprising six flotation platforms 105, provided with buoyancy by means of a framework 103 of sealed or thermally angle welded (e.g. pinch welded) plastic pipes. Again, hexagonal platforms are shown, although it is apparent that the platforms may be round, square, or triangular etc. allowing the system 101 to conform to complex custom shapes to integrate with an application system, landscape and/or desired process flow. Reference numeral 106 indicates a pivot point, formed by a removable connection between flanges of adjoining pipes, whereby components of the system 101 may be removed (or partially un-fastened) and folded for transport in more compact form (see FIG. 16).

Aerator 111, which may for example be a Toring Turbine as manufactured by Toring Turbine LLC, is a multi-directional turbine that produces aerated water flow outwards from the centre of the system 101. Submersible self-aspirating aerators, such as manufactured by ABS Wastewater Technology Ltd among others, may also be suitable in this location. Proximal to the aerator 111, the central platform 109 also comprises two foam breaker baffles 125, which may assist in re-incorporating generated foam in to the water flow generated by the aerator 111. The low angle baffles 125 illustrated are intended to reduce obstruction of the flow, although the shape adopted will depend on the particular circumstances and/or effect required.

FIG. 4 shows a plan view of, and FIG. 5 an enlarged side view from slightly above, a floating water treatment system 201 in accordance with another alternative embodiment of at least one aspect of the present invention. Similarly, like reference numerals may be assumed to refer to like features.

Central platform 209 is provided with a directional aerator 211 and deflector plate 212. The directional aerator 211 and deflector plate 212 generate a generally linear flow 221, in contrast with the multi-directional flow of the above-described embodiments. The attached growth media 7 is arranged in a parallel configuration so and correspondingly act as flow channelling baffles to further direct the flow generated by the system. Examples of suitable aerators would be the Turbo-Jet manufactured by LINN Gerätebau GmbH, the Aqua Turbo manufactured by Aquasystems International N.V., or the ABS Venturi Jet Aerator as manufactured by ABS Wastewater Technology Ltd (although the skilled person will appreciate that any suitable mechanical aeration, blower and/or diffuser or Venturi or aspirating type aeration apparatus may be employed). The deflector plate 212 improves directionality and prevents or reduces stirring of bottom sediments in shallow water applications but is not essential.

Foam breaker baffles 225 are also illustrated, as well as an air inlet 226 at the top of the foam baffle. Also illustrated in detail in FIG. 5 is a curved coupling bracket 204 which is used to connect adjacent platform frameworks 203 at pinch weld flanges 206.

FIGS. 6 and 7 illustrate a floating water treatment system 301 in accordance with a further alternative embodiment of at least one aspect of the present invention. Again, like reference numerals may be assumed to refer to like features. This embodiment is similar to the embodiment of FIGS. 4 and 5 in having a directional aerator 311 and deflector plate 312, however in an elongated configuration. The elongated configuration increases the amount of media within the flow path 321.

This embodiment also shows plants and corresponding plant roots providing both live substrate (natural) attached growth treatment media 307*b*, as well as engineered attached growth treatment media 307*a*.

Adjustable mounting brackets, 310 are also illustrated. The adjustable mounting brackets allow the angle or direction of flow to be managed, as well as the depth at which the aerator 311 operates.

FIG. 8 illustrates a floating water treatment system 301 in accordance with a yet further alternative embodiment of at least one aspect of the present invention. Again, like reference numerals may be assumed to refer to like features. This embodiment employs curtains 407*c* as attached growth media, the curtains constructed from geotextile or other appropriate material. The curtain configuration provides an alternative flow channelling system to direct flow 421. In addition, live substrate media 407*b* is shown within the flow 421 generated by directional aerator 411 and deflector plate 412.

FIGS. 9 and 10 illustrate a floating water treatment system 501 in accordance with a yet further still alternative embodiment of at least one aspect of the present invention. Again, like reference numerals may be assumed to refer to like features.

This embodiment employs a dual aerator configuration. Such a configuration is advantageous as it allows the aeration from a multi directional aerator 511*b* (e.g. of mechanical, diffuser or Venturi type), which will typically have a higher air delivery rate, to be dispersed in the flow from the directional aerator 511*a* (and deflector plate 512*a*), significantly extending the flow from the aerator 511*a* over a greater distance. This extends the contact time between the air and the water and increases oxygen transfer, as well as air to media 507 contact times.

The relationship between contact time of aeration bubbles as they travel through water and the amount of oxygen transferred is well known. Increased oxygen transfer, and increased media contact, provides increased metabolism and break down of (for example) organic carbon biological/ chemical oxygen demand (BOD/COD) and nitrification of nutrient pollution to achieve enhanced treatment.

The dual aerator embodiment offers particular advantages when the multi-directional aerator is of the diffuser type. Fine bubbles from diffusers transfer oxygen efficiently where there is sufficient water depth that useful bubble travel time can be achieved. Use of a dual aerator embodiment can extend the travel time of fine bubbles from diffusers, allowing their advantages to be enhanced and also to be applied in shallow water applications. Diffusers may be supplied by a compressed air supply from a blower mounted on the central floating platform, mounted on the shore, or optionally a submersible water cooled blower may be suspended below the central floating platform. The air diffusers may be of disk, tube or other design, and may optionally be integrated in proximity to the attached growth treatment media.

Attached growth media 507 is not shown in FIG. 10 in order to clearly (and generally) illustrate how the flow path 521 is established. Engineered or natural types (or a combination of both types) of attached growth media may be employed. It will be readily apparent how the configuration and/or arrangement of the attached growth media elements 507 influence the flow paths 521.

Combinations of directional and multidirectional diffusers and aerators offer considerable advantage and process benefits. In such a configuration, the directional aerator and the multi-directional aerator are integrated in a single system. The directional aerator may be located so as to direct flow towards the multi-directional aerator, or alternatively to draw water from it. A multi-directional aerator can typically deliver a greater volume of air to the water however the directional system can typically better propel the aerated water, thus increasing the potential contact time before air bubbles reach the surface—thus increasing oxygen transfer capacity. By combining these aerators in proximity or as one unit, both increased air delivery and longer contact time are achieved resulting in surprisingly increased treatment capacities.

An exemplary directional aerator utilises a self-aspirating impellor system enclosed within an encompassing housing. The housing typically features an opening at the bottom at one side with the outflow at the top on the opposite site from the inlet. This channels the flow in a single direction, reducing re-aeration and channelling outflow on a preferred direction.

An alternative directional aerator incorporates a directionally oriented self-aspirating non-clogging flow device, with a submerged motor and horizontal or slightly inclined shaft configuration. This configuration draws air down an intake shaft, and entrains it in a directional pattern generated by the impellor.

Optionally, where sufficient air supply is achieved by the multidirectional aerator or diffuser, the directional aerator may be substituted for a directional mixer, or similar flow generating device.

A multi directional aerator may employ an aspirating impellor system that circulates water in 360 degrees, evenly dispersing oxygen and circulation effects in all directions. A substantial upwards flow is created which can de-stratify sections where beneficial. Water to be treated typically undergoes two or more passes through the active zone with the application of a multidirectional aerator of this nature. Air is drawn down the impellor shaft, and dispersed out through holes in the rotating impellor. The impellor may be of a disk design or in another embodiment may incorporate multiple tubules, extending down the shaft and radiating outwards. Through centrifugal force of the spinning shaft, the tubules are extended and their speed through the water draws air down through the Venturi principle, where it is diffused in to the water.

Effective water treatment typically requires multiple stages, each requiring specific conditions for optimum treatment performance. An initial stage typically consists of a BOD/COD reduction and oxidation stage where a degree of mixing may be advantageous and acceptable. Subsequent stages may include a nitrification stage with increased media for stabilization of autotrophic nitrifying organisms.

A third stage may include a denitrification stage requiring an anoxic process. In this stage, aeration is restricted while circulation is maintained. Circulation with limited aeration may be achieved by suction from a directional power train system.

Where space and hydraulic retention time allows multiple passes through multiple stages, multiple times, provides advanced treatment. Alternatively a semi-complete recirculation also affords positive results where the system is configured for only a few stages. The overall system may be configured to prioritize a specified recirculation process according to the anticipated pollution loading and constituents, for example the nitrogen to COD/BOD loading ratio.

The final stage is typically a clarification stage, providing an acquiescent zone, for precipitation of suspended bacterial flocs, and suspended solids. This stage may optionally include an array of attached growth treatment media positioned so as to calm flow intercepting and filtering suspended solids in the waste stream. There will now be described some example treatment deployments.

FIG. 11 illustrates in schematic form a system configuration/deployment for a channel, lagoon or similar application with flow 621 entering at one end. Disposed within the channel is a number of floating water treatment systems 1 as described above with reference to FIG. 1 (although any system according to the present invention employing a multi-directional aerator may be employed).

(Note that in this deployment, and the other described deployments to follow, in the relevant Figures region "A" refers to a region in which oxidation occurs; "B" to a region where nitrification occurs; "C" to a region where de-nitrification occurs; "D" to a region where clarification occurs; and "E" to a region or body of treated water).

As flow enters the channel, an initial process stage for oxidation, and break down of BOD/COD occurs in region A. As the flow progresses, BOD/COD level is reduced and nitrifying bacteria are established in greater numbers, stabilized by attached growth surfaces of first system 1. Subsequent systems 1 provide on-going BOD/COD breakdown processes (schematically indicated by regions A) as well as nitrification processes (schematically indicated by regions B).

In this way, BOD/COD may be substantially reduced and remaining units 1 may favour nitrification and nutrient removal process (regions B). In order to achieve de-nitrification units may be spaced to allow the necessary anoxic conditions for de-nitrification to be achieved (regions C for example).

Denitrification (regions C) as well as clarification (region D) may also be effectively achieved through pulsed timing of the aerators of the deployed systems 1. For example, all systems may run for a number of hours, and then all may be shut off periodically allowing anoxic conditions and de-nitrification to temporarily develop reducing nitrogen in the outflow and increasing purity of the water output (region E).

Multiple systems according to varying embodiments of aspects of the present invention may be linked in series or configured to provide complex flows with the substantial benefits to be had by establishing linked and overlapping recirculating flow patterns.

FIG. 12 shows a deployment that achieves a type of circular process flow configuration. The combination of directional flow, multi-directional flow, and diffused or Venturi aeration as suitable allow complex process flow patterns to be achieved with increased efficiency, and improved performance.

A tank, vessel, lagoon, lake or waterway is shown with a three-system deployment. The deployment is arranged to provide a circular re-circulation. Incoming water (721) first undergoes an aerobic oxidation breakdown (A) at a multi-directional system 1. It is mixed with a portion of re-circulated flow, directed back by a directional system 201 (corresponding, for example, to system 201 of FIG. 4). The amount of recirculation may be controlled by the angle, power, speed and timing of aerator of the directional system 201. Recirculation may typically be a multiple of 1× to 10× of the incoming flow 721, though this will depend on the particular circumstances and may be re-configurable.

Advanced nutrient removal may be achieved through adjustment of operational rate, and timing of each system 1,201. For example all units 1,201 may run, and then all units 1 except the directional flow unit 201 are turned off. In such a process, a highly aerobic process occurs as the first step and then the air supply is reduced but the directional flow is maintained. The directional flow recirculates water containing nitrates nitrified in the first process stage in region B. As the high nitrate water recirculates it is combined with new inflowing water providing the carbon source in the form of BOD & COD necessary for de-nitrification to occur (region C). In a reduced air process stage, hungry heterotrophic organisms may also take up exceptionally high levels of phosphorous, in the sudden change of process conditions. Sludge extraction or stabilization can be implemented to effectively remove this phosphorous from the water.

The configuration in FIG. 13 may be operated to provide a number of process stages by use of timers, automatic probes, or manual adjustments. Systems 1,201 may be operated in a timed series, or in pulses to achieve the maximum efficiency. Pre-set algorithms may be programmed, triggered by flow or concentration events. Triggering may include, for example a change in DO, NH3, or Redox, at the inflow or outflow 821. Each event may trigger a different pre-programmed operational response including series of operation, time, rate, power and series for example.

In this deployment, a "figure eight" configuration is provided with each process loop set to run in opposing directions. The upper two units (proximal to the inflow), may be run as a unit, and then the bottom two units (proximal to the outflow) may be run subsequently. In this process two recirculating zones are provided in series. The operational rate and number of circulations is adjustable in each zone. At the intersection of the loops, water is drawn back to the first loop from the second loop by the directional system 201.

FIG. 14 shows a sophisticated layout with multiple re-circulation zones to achieve advanced treatment and pollution removal. This configuration mimics aspects of a cross vertex spiralling flow typical of a natural waterway.

As with the system shown in FIG. 13, each process stage may be operated with multiple variables to provide an exceptional range of flexibility (for example, to respond to variations in flow and pollution concentration and outflow water quality target in highly efficient manner).

An installation of this scale may have the treatment capacity to treat the wastewater equivalent to ten thousand people or more, to secondary standards, with the appearance of an archipelago of floating islands. Controls, probes and timers, or both may be triggered by flow and loading variations and events. The flow pattern may be logged, and the efficacy of the operational response monitored through online instrumentation. Through a learning process of trial responses to variations in inflow, operating software may become increasingly refined and the operational process control develops and evolves over time.

FIG. 15 illustrates in schematic form an array of frameworks 1003 having supporting braces 1002 extending between opposite sealed or thermally angle welded pipes to provide support for media (indicated generally by 1005). The brace is oriented so as to sit down below the centre-line of the rest of the structure. This, for example, maintains the mesh at the correct elevation and provides additional buoyancy as it will generally be submerged.

FIG. 16 illustrates in schematic form a framework 103 as previously described with reference to FIG. 3 above, in which the removable connection has been removed and the framework 3 folded for transport or storage in more compact form. Note that the curved bracket or rotator used to connect the modules holds them closely together and stable against wracking forces, but allows flexibility horizontally. Wave action may otherwise stress the connection points. Where flat flanges are used the stress of wave action may be conveyed directly to the plastic material, which would weaken it over time. The curved bracket disclosed above allows the stress of wave motion to be dissipated as the individual units can freely pivot about the respective bracketing point.

FIG. 17 illustrates a side view, above and below the water's surface, of a preferred element of the system containing both multi directional diffused 539 and directional aeration 511 circulators. The directional aerator is configured so as to interact with the multi directionally diffused air bubbles, extending their horizontal trajectory in zone (L) and contact time before reaching the surface, so as to increase oxygen transfer rates, providing highly active aerobic biofilm zones, H, I, A, L & G Preferably, the operational rate of each aerator circulator in this element may be adjustable both in operational time, and operational rate.

Optionally, the directional aerator circulator is a Fuchs Oxystar™ aerator.

Optionally the multi directional aerator, is a diffuser, such as a flexible weighted diffuser as provided by Dryden Aqua™.

Anchors, shown in the figure are of a movable sort allowing adjustment of direction, and location of the units.

FIG. 18 illustrates an element of the present invention where multi directional flow diffusers 439 are contained within a flexible textile shroud 436 which channels the water to provide a directional flow 421 through several biofilm treatment zones, H, I, & G.

A flexible directional textile shroud is hung from the floating platform 405 and stabilised with weights along its bottom edge.

Compressed air is expelled through a frameless weighted flexible diffuser 439 placed below the module.

Optionally the diffuser 439 may be connected to and hung from the textile shroud 436.

The water flow 421 within the channelling biofilm textile 436 is channelled upwards and towards the outlet openings through biofilm zones which preferably include:

DYNAMIC MEDIA, ZONE G characterised by high surface area, low density artificial media, high flow through capacity, multi axial dynamic movement, and self-cleaning flexible characteristics conducive to the treatment of BOD and COD and capable of managing a high flow and high TSS without clogging.

PARTIALLY SUBMERGED MEDIA ZONE H characterised by elongate fibrous media, low flow through capacity, medium density, high specific surface area, and a portion above the water's surface, capable of supporting the establishment of higher emergent organisms with complex metabolic pathways conducive to reducing pollution by moving it up the food chain.

LIVE SUBSTRATE ZONE I Characterised by live substrate media consisting of the roots of a poly-culture of emergent aquatic plant species with a mixed density and moderate flow through capacity, where the roots, exude enzymes, and carbohydrates and form symbiotic relationships with aquatic organisms stabilising the system during fluctuations in flow and loading and continuous biological seeding the water body and surrounding biofilm zones with healthy population of beneficial microbial organisms while the plants themselves directly absorb nutrients in the water.

FIG. 19 illustrates an element of the present invention, incorporating a planted multi-layer soil plant root endogenous carbon bio-filter cover installed over the aeration section.

Odours such as hydrogen sulphide and methane 1147 are released during the aeration and circulation process.

The soil, and plant based endogenous carbon bio filter 1148 supported on floats 1105 filters out the malodorous gases 1147, which are absorbed by microorganisms populating the bio filter cover. The bio filter may be applied over a mechanical aerator or diffuser, or other aeration device so as to provide gas filtration.

Additionally the floating bio-filter serves to filter out potentially pathogen carrying airborne water droplet aerosols 1147, preventing them from escaping, where they may cause a threat to public health. Water passing through this element may be conveyed through process zones, G, H, I or L FIG. 20 shows a section view of an embodiment of the system illustrating the synergistic effects of multiple treatment zones, mimicking the flows and processes of a natural waterway.

Process zones and elements are described from left to right.

At the left hand side of the illustration a series of five partial depth baffles create a beneficial over under flow path with multiple zones of full and partial circulation in a serpentine flow path 46.

Top hung partial depth baffles 32a, 32b, 32c are hung form surface floats, and weighted along the bottom edge, the depth may be adjusted and the material is of a biofilm compatible material 36 providing a further biofilm attached growth treatment surface.

Submerged partial depth baffles 33 are weighted at the bottom of the water body, and are lifted upwards by floats the depth may be adjusted.

Optionally partial depth baffles, as shown on the central top hung partial depth baffle 32b may incorporate air diffusers 39 which add to the recirculation in this zone.

Multiple series of partial depth, or partial width baffles may be employed in this fashion to establish serpentine flow paths as required to provide sufficient treatment for the pollution mass loading.

This element, shown in FIG. 20 provides a series of beneficial treatment zones, including:

MICRO RECIRCULATION ZONE M characterised by short cycle recirculation, lower flow rates, secondary stage processes, secondary microbial consumers, and conditions suitable for autotrophs and conducive to nitrification and de-nitrification processes.

PRECIPITATION ZONE D facilitating Precipitation of suspended solids;

BENTHIC ZONE K Characterised by submerged bottom detritus, submerged media, low flow velocities and precipitation of suspended solids, sediment digestion and de-nitrification processes.

Also, in the left hand element in FIG. 20, is a placement of embodiment 101 located above the serpentine flow created by the partial depth baffles. In this series element 101 provides additional biofilm zones directly interacting with the serpentine path and its respective zones.

Additional zones, provided by the integration of 101 include:

PARTIALLY SUBMERGED MEDIA ZONE H characterised by elongate fibrous media, low flow through capacity, medium density, high specific surface area, and a portion above the water's surface, capable of supporting the establishment of higher emergent organisms with complex metabolic pathways conducive to reducing pollution by moving it up the food chain.

LIVE SUBSTRATE ZONE I Characterised by live substrate media consisting of the roots of a poly-culture of emergent aquatic plant species with a mixed density and moderate flow through capacity, where the roots, exude enzymes, and carbohydrates and form symbiotic relationships with aquatic organisms stabilising the system during fluctuations in flow and loading and continuous biological seeding the water body and surrounding biofilm zones with healthy population of beneficial microbial organisms while the plants themselves directly absorb nutrients in the water.

The linkage between flow zones, and biofilm zones illustrates the beneficial interaction, which can be obtained by linking the features and zones, offered by partial depth baffles and a serpentine flow path, 46 with the zones offered by the multi directional flow element 101. In particular, the multiple micro recirculation zones convey the water through the biofilm zones of embodiment 101 many more times creating multiple beneficial passes as a result of the integration of elements.

A further embodiment 1401 is shown in FIG. 20 with a floating structure constructed by containing sealed empty plastic bottles within a surrounding mesh, net, or textile containment.

In this second module, frameless flexible moving dynamic media columns 07 are suspended. Optionally in this illustration, diffusers 39 are integrated with the dynamic media providing increased circulation directly within the attached growth treatment media array. The diffusers 39 are weighted 40 at the ends of the media columns.

This element 1401 provides several process zones including:

DYNAMIC MEDIA, ZONE G characterised by high surface area, low density artificial media, high flow through capacity, multi axial dynamic movement, and self-cleaning flexible characteristics conducive to the treatment of BOD and COD and capable of managing a high flow and high TSS without clogging.

LIVE SUBSTRATE ZONE I Characterised by live substrate media consisting of the roots of a poly-culture of emergent aquatic plant species with a mixed density and moderate flow through capacity, where the roots, exude enzymes, and carbohydrates and form symbiotic relationships with aquatic organisms stabilising the system during fluctuations in flow and loading and continuous biological seeding the water body and surrounding biofilm zones with healthy population of beneficial microbial organisms while the plants themselves directly absorb nutrients in the water.

In this series, an interaction between embodiment 1401 with Embodiment 101 and the serpentine path is obtained with the last of the top hung partial depth baffle's 32*a*. This interaction creates an additional process zone, M which also benefits from biofilms established on the textured baffle surface 36 establishing the additional, MICRO RECIRCULATION ZONE M characterised by short cycle recirculation, lower flow rates, secondary stage processes, secondary microbial consumers, and conditions suitable for autotrophs and conducive to nitrification and de-nitrification processes.

A third element 501 is shown in this illustration incorporating a directional flow aerator circulator and a multi directional diffuser 39 placement, as shown in FIG. 17.

Centrally in FIG. 20 there is a floating access walkway, shown in configuration adjoined to the dual process module 501.

The central walkway, serves to convey compressed air and power to the various units as needed as well as to provide access. Additionally the floating walkway supports a full depth partial width containment baffle 28 as shown in FIGS. 21 and 24, with a textured surface providing a further surface for biofilm production, 36.

The combination of these elements, 501, 1401, 41, 36 of the system in configuration provide multiple interconnected benefits. The directional and multi directional aerobic elements, 11 and 39 work together in increasing oxygen transfer. Contained by the baffle 27 hanging from the walkway 41 upward and downwards micro recirculation zones M are established. 501 conveys a flow path towards, embodiment 1401 and the flow beneficially meets with a further opportunity for interaction with biofilm zones G and zone I in 501 before passing back through micro-recirculation zone M and back again, and making further recirculation pass through embodiment 501 and zones H and I before being conveyed to the next treatment stage around partial width baffle 28 where it further contacts biofilms on the textured surface 36.

The interaction of elements surrounding 501 in this configuration demonstrates the beneficial effects the present invention provides. Rather than a single pass through a standard treatment stage water passes through multiple stages many times achieving effective chemical free treatment.

The fourth module from the left in FIG. 20 is a floating flow conveyance channel 31, as shown in FIG. 25, and also at the side of FIG. 24. Floats support a hanging impermeable membrane, 36 weighted with gravel or, other sinking material along its bottom. Optionally cross braces, support planted media modules 35 improving the water quality as it flows along the channel to its outlet, establishing:

MACRO-RECIRCULATION ZONE N Characterised by extended cycle recirculation moderate flow rates, mixing of new influent and recycled influent, conducive to both heterotrophs and some autotrophs and providing secondary and tertiary oxidation and breakdown processes.

The fifth planted module, furthest to the right side of FIG. 20 shows a separating containment baffle 27 as shown in plain view in FIGS. 21 & 22.

A multi directional flow diffuser element, placed in proximity to the containment baffle 27 achieves additional circulation benefits generating directional flow pathways to establish embodiment 401 as the flow from the diffusers interacts with the containment baffle forcing it outwards away from the baffle 27 or other obstructing element, wall, slope or waterway edge, as it rises to establish a directional flow device and directional flow path 21, so as to create a generally directional flow device with a directional flow of about 180 degrees or less as a result of the integration of the diffuser and the channelling or directing side or edge obstruction. This embodiment is particularly suited as a floating edge treatment in vertically sided water bodies.

Where a floating planted waterway edge zone is to be extended over a distance, and where the waterway edge has bends, a bracketing system may be employed, which preferably consists of angled tension and compression cross braces, adjustment of the braces may be made to force the outer floatation element to elongate and the inner floatation element to shorten forming a curve, which once the brackets are secured, will hold a fixed shape allowing a floating edge element to match a bend in a water body.

Overall the elements shown in FIG. 20 are exemplary, of the benefits offered by the present invention, achieving multiple passes through multiple biofilm phases and zones of circulation and recirculation achieving a complex series of interlinked treatment processes in a technical adjustable and configurable water treatment system which mimics the multiple phases, zones, and stages of a natural river or waterway.

Each element in the system offers a particular benefit contributing to the capacity of the interlinked in a synergy of the system, in a similar fashion to a fully developed natural aquatic waterway ecosystem. The present invention applies this principle, through the implementation of a series of manufactured re-configurable elements to establish these zones, within a controllable, configurable, and adjustable system, which is economical to install and operate.

As a more specific exemplary description of the overall beneficial multi zone process FIG. 20 shows the following passes through, the following zones.

Typically four passes through two elements of DYNAMIC MEDIA, ZONE G characterised by high surface area, low density artificial media, high flow through capacity, multi axial dynamic movement, and self-cleaning flexible characteristics conducive to the treatment of BOD and COD and capable of managing a high flow and high TSS without clogging. Typically seven passes through PARTIALLY SUBMERGED MEDIA ZONE H characterised by elongate fibrous media, low flow through capacity, medium density, high specific surface area, and a portion above the water's surface, capable of supporting the establishment of higher emergent organisms with complex metabolic pathways conducive to reducing pollution by moving it up the food chain.

Typically eight passes through LIVE SUBSTRATE ZONE I Characterised by live substrate media consisting of the roots of a poly-culture of emergent aquatic plant species with a mixed density and moderate flow through capacity, where the roots, exude enzymes, and carbohydrates and form symbiotic relationships with aquatic organisms stabilising the system during fluctuations in flow and loading and continuous biological seeding the water body and surrounding biofilm zones with healthy population of beneficial microbial organisms while the plants themselves directly absorb nutrients in the water. Typically three passes through BENTHIC ZONE K Characterised by submerged bottom detritus media, low flow velocities and precipitation of suspended solids, sediment digestion and de-nitrification processes.

Two locations of PRIMARY FLOW ZONE L Characterised by high flow & loading rates, primary producer bacteria, favouring heterotrophic processes with suspended growth portion conducive to the breakdown of BOD and COD.

Five sites providing MICRO RECIRCULATION ZONE M characterised by short recirculation cycles, lower flow rates, secondary stage processes, secondary microbial consumers, and conditions suitable for autotrophs and conducive to nitrification and de-nitrification processes.

As well as MACRO RECIRCULATION ZONE N Characterised by extended recirculation cycles moderate flow rates, mixing of new influent and recycled influent, conducive to both heterotrophs and some autotrophs and providing secondary and tertiary oxidation and breakdown processes.

The complexities of these processes are achieved with flexible and adjustable non-clogging durable elements allowing for highly efficient water treatment processes to be achieved at reasonable costs, with the overall appearance of the system being similar to a natural waterway park.

FIG. 21 illustrates a plan view, of the present invention where the system is installed at the edge of a water body, and is configured so as to intercept pollution entering the water body from a side tributary, or influent source, such as a stream, pipe, or combined sewage storm water overflow point.

The series of elements are configured to provide a partitioned 27 and separated treatment system reducing pollution before the treated water is discharged to the receiving water body.

The system is contained with the use of a floating and weighted baffle curtain 27 on one side, and the shoreline or a second curtain baffle on the other. The influent water is conveyed along this channel 21.

Side baffles 28 extend generally perpendicular to the direction of flow forcing the water being treated to follow a serpentine plug flow path through a series of treatment zones or cells.

Floating treatment elements are configured in series along the treatment path in each zone or cell.

In this example the first cell incorporates a multi directional flow module at the influent point 101.

In the second cell, two directional flow units are linked forming a double cycle element 501 generating a circulating spiralling flow in the second cell.

In the third cell, two opposing side mounted 180-degree directional flow units 401 are configured forming the final stage, though it shall be understood that the flow channel and series may be continued, as necessary to achieve the required treatment before the treated water is discharged to the receiving water body.

Preferably, the final stage in this embodiment may also include a riparian aggregate media filter, as shown in FIGS. 26, 27 and 28.

The system contains multiple, adjustable, and re-configurable process zones, including G, H, I, K, L, M, & N effectively exemplified in FIG. 20.

FIG. 22 illustrates a plan view, of the present invention where the system is installed at the edge of a water body, and is configured so as to intercept pollution entering the water body from a side tributary, or influent source, such as a stream, pipe, or combined sewage storm water overflow point for example, as in FIG. 21, with treatment zones, as exemplified in FIG. 20.

In this example the series of elements are configured to provide a partitioned and separated treatment system, reducing pollution before the treated water is discharged to the receiving water body.

Baffle partitions 28 are configured to provide a series of overlapping serpentine and elongated flow paths generally perpendicular to the direction of the influent. Modules are arranged in series along the flow path.

The first module, is located towards the mouth of the influent source, and in this example the module is this location is shown as a combined module 501 consisting of a directional flow power train, 201 and a multi directional flow element 101 where the directional flow aspect pushes the directional follow in a generally horizontal direction, extending its horizontal travel of air bubbles introduced and improving both oxygen transfer and circulation effect as shown in FIG. 17.

A series of further directional flow elements, 201, multi directional flow elements, 101 and baffle channelled directional flow elements 401 are configured in series along the treatment pathway, as exemplified in FIG. 20. It shall be understood that, the series of specific units may vary according to the site application.

Overlapping channelized flow paths provide efficient opportunities for recirculation from the end stage sections to initial stage sections interlinking media zones and reticulation types establishing multiplier effects. Recirculation in this way, at recirculation point offers opportunities for advanced nutrient removal where a reduced pollution loading is required to achieve treatment processes such as nitrification, and where by a carbon source required affecting a second treatment stage such as de-nitrification. Drawing water from the final, stage after nitrification and re-introducing it to the initial stages allows the organic pollution loading, to provide the carbon source for effective de-nitrification processes to take place. A macro recirculation point is shown, just behind the second unit. Optionally the final stage in this system may also employ a subsurface gravel filter of the type as shown in FIGS. 26, 27, & 28.

This embodiment effectively protects a water body form incoming pollution such as form a combined sewage overflow source, providing multiple treatment zones, G, H, I, K, L, M, & N effectively exemplified in FIG. 20.

FIG. 23 illustrates plan view example of the present invention, as installed within lagoon, pond or other containment.

In this embodiment, the cell is partitioned with a lateral dividing baffle 28. Optionally the baffle is widened to support a floating access walkway 41 and distribution of compressed air and electricity to each of the respective stages.

The flow passes through a series of treatment stages, with the first three stages having linked directional and multi directional process elements 501 as shown in FIG. 17 and the third stage having a multi directional module 101.

Before the outflow, there is optionally provided an adjustable flow recirculation channel 31. This embodiment provides multiple treatment zones, H, I, K, L as effectively exemplified in FIG. 20.

FIG. 24 illustrates a plan view of an example of the present invention, as installed within lagoon, pond or other containment body.

In this embodiment, the cell is partitioned with a series of one or more generally perpendicular dividing baffles 28. Optionally the baffles are widened to support floating access walkways, and distribution of compressed air and electricity to each of the respective modules. Baffles may be of a full depth type, or may extend fully across the containment in a partial depth under over system as shown in FIG. 20.

The final stage is a clarification and precipitation stage D

In this embodiment the flow passes through a series of treatment stages or cells each stage or cell providing a cascading treatment process.

Preferably the modules in each stage are adjustable in configuration, operational time and operational rate.

Before the outflow, there is optionally provided an adjustable flow recirculation channel 31 or duct operated by a low head airlift or pump with adjustable control of the recirculation rate.

This embodiment provides multiple treatment zones, H, I, K, L as effectively exemplified in FIG. 20.

This embodiment may be contained within a flexible impermeable liner. Modular elements may be packed and readily shipped allowing a cost effective multi stage treatment system, which mimics the natural process of a waterway within and engineered treatment system to be cost economically and quickly constructed.

FIG. 25 of the present invention shows perspective view of a detail of one embodiment of the recirculation channel 31 shown in plan view in FIG. 24, and in section view in FIG. 20 as a floating conveyance channel.

Wherein the circulation channel 31 consists of an impermeable membrane suspended from floatation supports.

Wherein the flow is conveyed across the encompassing water body. Optionally, aquatic plant supporting media modules and zones may be configured along the channel with roots extending down in to the flowing water in the channel. Optionally, the channel contains gravel substrate media weight at the bottom.

FIG. 26 illustrates section view example of the present invention, wherein a subsurface gravel embankment 1201 at the edge of a water body is connected to one or more large diameter air lift tubes situated in proximity to a series of floating modules, 101.

The suction, created by the rising air in the air-lift tube 1234 draws water in to the gravel filter, by means of a circulation pipe and an infiltrator pipe 1238 within the subsurface gravel media. The gravel media provides a biofilm Zone J Characterised by layers of aggregate mineral biofilm media with high surface area and medium flow through capacity conducive to the fixing of phosphorous and the filtration, precipitation, and adhesion of particulate pollution benefiting water quality and clarity.

Element 101 benefits from the multi directional circulation flow, achieving treatment Zone G characterised by high surface area, low density artificial media, high flow through capacity, multi axial dynamic movement, and self-cleaning flexible characteristics conducive to the treatment of BOD and COD and capable of managing a high flow and high suspended solids without clogging; Zone H characterised by elongate fibrous media, low flow through capacity, medium density, high specific surface area, and a portion above the water's surface, capable of supporting the establishment of higher emergent organisms with complex metabolic pathways conducive to reducing pollution by moving it up the food chain; and Zone I characterised by live substrate media consisting of the roots of a poly-culture of emergent aquatic plant species with a mixed density and moderate flow through capacity, where the roots, exude enzymes, and carbohydrates and form symbiotic relationships with aquatic organisms stabilising the system during fluctuations in flow and loading and continuously seeding the water body and surrounding biofilm zones with healthy population of beneficial microbial organisms while the plants themselves directly absorb nutrients in the water.

The interconnection of Zone J with the air lift, and zones G, H & I exemplifies the multiple benefits, achieve by a synergistic series of ecological treatment elements.

FIG. 27 illustrates a similar embodiment as shown in FIG. 26, but where the influent gravel filter 1337 is disposed within the water body as a subsurface mound, with the capacity to filter water from all sides, increasing the surface area of the filter many fold, effectively doubling its functional life span before cleaning. As in FIG. 26 the interconnection of Zone J with the air lift, and zones G, H & I as described in FIG. 26 exemplifies the multiple benefits; achieve by a synergistic series of ecological treatment elements.

FIG. 28 shows, a similar system as in 27, however rather than an airlift, being used to draw water through the gravel filter a directional aerator 1311 circulator or propeller pump is used.

A pipe, with flexible sections connects the infiltrator 1338 in the gravel filter 1337 to the circulation pipe, and to the circulator 1311 providing process exemplified in zone J Characterised by layers of aggregate mineral biofilm media with high surface area and medium flow through capacity conducive to the fixing of phosphorous and the filtration, precipitation, and adhesion of particulate pollution benefiting water quality and clarity. A housing around the impellor of the directional circulator channels the flow achieving filtration, aeration, circulation, and recirculation through zones G, H, I, and M as described in FIG. 20 with no additional energy expenditure, further exemplify the economic and treatment process benefit of the present invention.

FIG. 29 shows a detail of a preferred embodiment of attached growth treatment element 7 as it is deployed within the system.

This element has several important features. The attached growth media element is oriented around a semi flexible core, and the media surfaces extend outwards. The media surfaces may be non-woven non braided fibre elements as shown in 7c or textile leaves, or a mixture of both fibres and leaves 7b. The diameter of the core flexible vertical element is always less than the diameter or width of the media surfaces.

The fibres or leaves surfaces extend outwards in flexible array situated so as to catch rising bubbles. The flexible feature of the radial elements allows the system to be self-cleaning allowing the circumference of each media column to be increased over 400 mm in diameter.

Media surfaces are open ended avoiding loops or woven sections which could lead to clogging.

The fibbers are fixed to a solid core, which has the important feature of having both rigid and flexible characteristics, to allow bending as shown in 7c while maintaining a certain rigidity to prevent tangling. The media columns are each independent being affixed pith a swivelling bracket at the top and being free moving at the bottom. Their movement is not obstructed by any frame or structure and they may fold upwards 7d in high flow situations. The density of media surface is greater at the core, providing a protected zone conducive to biofilm growth around the flexible core. In this way both robust biofilms, at the ends of the surfaces and more delicate biofilms to can both form within each media column. Optionally this element may contain integrated are diffusion as shown in FIG. 20, embodiment 1401

This element of the system is a preferred means of establishing DYNAMIC MEDIA ZONE G characterised by high surface area, low density artificial media, high flow through capacity, multi axial dynamic movement, and self-cleaning flexible characteristics conducive to the treatment of BOD and COD and capable of managing a high flow and high total suspend without clogging.

FIG. 30 illustrates a section view of the present invention, wherein the system is integrated with an extended area of waterscape and wetland edge integrated elements. A the left of the illustration an air lift pump 34 incorporating a diffused air outlet, 39 draws water from an infiltration manifold, 38 buried within a directional flow gravel filter media Ec, comprising zone J; the outflow from the air lift, which may also be a propeller pump or other circulation device is located someway in from the edge of the main water body and establishes zone N.

In the illustrated example, the outflow form the air lift flows up and out underneath a floating module 5a establishing embodiment 101 and zones I & H; a portion of the water is circulation on a short cycle micro recirculation path, according to Zone M and the majority of the water flows out, through a gravel media 37 filtration berm, in a horizontal subsurface flow, 43; passing one or more mineral media layers, shown in this illustration as Ea which may be a phosphorous binding media, and Eb which may be a finer grade of media, within the overall embodiment of 1201.

Passing through Eb the flow continues filtering through emergent aquatic plants in a surface flow path, 42; it shall be understood that any a plurality of filtration berms, directional and single directional flow gravel filters, and surface and sub-surface flow elements as may be interlinked extending in a wetland environment extending the system to achieve the required level of treatment.

Above directional gravel filter 1201b this is a passive, floating module without direct integration with any one aeration or circulation device, this element 5b adds to the total surface areas for biofilm growth, and process zones within the overall system, and it shall be understood that passive elements, such as this one are common features of preferred embodiments of the present invention.

To the right of the illustration is shown a vertical solid wall, with a floating module 5a fixed to the wall by a means, which allows it to move up and down according to variations in tides or other variation in the water elevation.

Below the floating module 5a is shown a diffuser, in this embodiment the wall forms an obstruction channelling the flow outwards away from the wall, or other such obstruction in a generally directional flow path, in this way element 5a, combined with diffuser 39, and an obstruction or channel embodies the features of one type of directional flow device 201. FIG. 30 also shows a sediment extraction pipe, mounted to the wall to the right of module 201. This pipe allows, sediment to easily be removed by any adequately equipped sediment suction pump, this feature may be deployed in one or several locations of the system shown in drawing #30, or in any other embodiment, preferably in precipitation zone K where sedimentation or sludge build up may occur.

In this illustration, the floating planted module 5a is to be considered to be extended over a distance, and wherein the extension over a typical distance of wall of a water body is understood to have curved sections, in this embodiment of 5a shown in FIG. 31

FIG. 31 shows the floating module 5a in plan view as a curved module adjustable on site to conform to the waterway bends, and locked in position to the set shape and curve of the corresponding wall, edge or shape. A bracketing system is employed, which preferably comprises angled tension and compression cross braces, 3b wherein adjustment of the braces may be made to force the outer floatation element 3c to elongate and the inner floatation element 3a to shorten forming a curve, which, once the brackets are secured, will hold a fixed shape allowing a floating edge element to match a bend in a water body as illustrated FIG. 5a shown in section view in FIG. 30 and in plan view FIG. 31 this method as generally defined by FIG. 31 may be applied in the construction of floating walkaways, or curved shapes or elements requiring increased strength or curvature.

The present invention provides a cost effective, easy to transport and easy to install floating water treatment technology to address the problem of water contamination. The system may be applied in a lagoon, in a surface flow wetland system, or in a new treatment plant. It may also be applied in open waterways such as canals, rivers, ponds or lakes without the requirement for a controlled reactor volume.

The present invention provides a modular, floating, (optionally foldable) and shippable treatment system which can effectively be used to complete decentralized waste water treatment plants, reducing or negating the length and cost of piping networks.

A treatment system according to the invention may also be inserted in to an existing treatment system, increasing its capacity and performance.

Provision of a hollow structural cover provides a means for containing contaminant carrying aerosols, typically associated with mechanical aeration devices. Such a component also allows for filtered air to pass through planted media (where present), replacing and replenishing oxygen diffused by the aeration equipment and providing a primary filter, to malodorous gasses potentially released in the aeration process.

Integrated treatment systems according to the present invention may, for example, be deployed within a water area which is periodically subject to combined sewage overflow or storm drain discharge. Such systems may be aesthetically appealing yet provide a powerful treatment process reducing pollution and protecting the environment, without the need to compromise on form or function. They may also be applied in locations where it is desired to recycle water, and a cost effective, low impact treatment is required. It may also be applied in bioremediation purposes and for retrofitting in existing treatment works. Embodiments of the invention provide for rapid deployment of effective water treatment systems.

The invention provides an integrated water treatment system and arrangements of such water treatment systems, suitable for use in the treatment of contaminated water, wastewater, potable water, industrial water as well as polluted water bodies. An integrated water treatment system according to the invention comprises one or more modules adapted to float in a body of water, one or more attached growth media elements for suspension in the body of water; and one or more aeration devices suspended from the at least one module for aerating the body of water, and to generate water flow where the one or more attached growth media elements are disposed within the water flow. The system may include a multi-directional aeration device, a directional aeration device, or a combination of multi-directional and directional aeration devices. Arrangements including a plurality of integrated water treatment systems are also disclosed.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention herein intended.

The invention claimed is:

1. An integrated water treatment system for use in the treatment of contaminated water, wastewater, potable water, aquaculture, industrial water and polluted water bodies, the system comprising:
   at least one module adapted to float in a body of water;
   at least one attached growth media element suspended from the at least one module in the body of water; and
   at least one aeration device suspended from the at least one module for aerating the body of water;
   wherein the at least one aeration device is arranged to generate at least one water flow path;
   wherein the at least one attached growth media element is disposed within the at least one water flow path;
   wherein the at least one module comprises a buoyant structure comprising a buoyant framework comprising three or more sealed lengths or sections of pipe that are connected to one another;
   wherein ends of the sealed lengths or sections of pipe are pinch welded to form flanges at the ends of the sealed lengths or sections of pipe such that the flanges are integrally formed with the sealed lengths or sections of pipe;
   wherein the sealed lengths or sections of pipe are arranged such that the flanges are vertically oriented; and
   wherein the flanges are bent to a pre-specified angle relative to a length of the sealed lengths or sections of pipe.

2. The integrated water treatment system of claim 1, wherein the at least one aeration device comprises at least one of: a multi-directional aeration device configured to generate water flow paths in a plurality of directions; and a directional aeration device configured to generate one or more water flow paths in substantially a single direction.

3. The integrated water treatment system of claim 1, wherein the attached growth media elements are selected from the group consisting of: the submerged roots of a first species of aquatic plant; the submerged roots of a second species of aquatic plant; a partially submerged horizontal media structure comprising one or more layers of elongate elements; a submerged artificial media comprising elongate elements; a textured textile surface; and a mineral aggregate media.

4. The integrated water treatment system of claim 1, wherein the at least one attached growth media element comprises a plurality of types of attached growth media elements disposed upon the at least one module, disposed within a plurality of water flow paths so as to define a corresponding plurality of water treatment zones.

5. The integrated water treatment system of claim 1, comprising at least two modules, connected together or separate and adjacent to one another, and configured so as to provide first and second water treatment zones that are interlinked, adjacent or overlapping.

6. The integrated water treatment system of claim 1, wherein at least one of the attached growth media elements comprises a plurality of attached growth media surfaces and a semi-rigid elongated core; wherein the attached growth media surfaces extend from the elongated core; wherein the attached growth media surfaces are arranged in a helical or angled array along a longitudinal axis of the elongated core, and wherein the elongated core is affixed only at one end allowing multiple axis of movement.

7. The integrated water treatment system of claim 1, further comprising a cover mounted upon the at least one module and comprising a multi-layer planted floating biofilter to absorb odours and aerosols released from the water by the at least one aeration device.

8. The integrated water treatment system of claim 1, further comprising an elongated impermeable membrane trough suspended from a flotation support structure so as to provide a floating flow channel.

9. The integrated water treatment system of claim 1 adapted to draw water through a gravel filter or extended area of aquatic vegetation disposed in or at the edge of the body of water.

10. The integrated water treatment system of claim 1, wherein at least one aeration device is arranged to produce at least one recirculation flow path that coincides with a plurality of water treatment zones.

11. The integrated water treatment system of claim 1, configured to provide one or more zones selected from the group consisting of: a macro scale extended cycle recirculation zone; a micro scale short cycle recirculation zone; a primary flow zone; a benthic zone; a mineral filter zone; a live substrate zone; a partially submerged media zone; and/or a dynamic media zone; wherein the zones are provided by appropriate selection of attached growth media elements and/or water flow rates.

12. The integrated water treatment system of claim 1, wherein the at least one module comprises a platform.

13. The integrated water treatment system of claim 1, wherein the at least one aeration device is suspended from the at least one module by an adjustable mount adapted to vary the depth and/or flow angle of the aeration device.

14. A water treatment system comprising plurality of integrated water treatment systems according to claim 1, the plurality of integrated water treatment systems being arranged so as to circulate water from one integrated water treatment system to another.

15. The plurality of integrated water treatment systems of claim 14, arranged so as to define one or more of: zones of fully and/or partially treated water; zones where suspended solids are settled; denitrification zones; and/or a plurality of processing loops.

16. The plurality of integrated water treatment systems of claim 14, configured to operate in response to one or more measured or determined water content values.

* * * * *